(12) United States Patent  
Sasaki et al.

(10) Patent No.: US 7,924,528 B2
(45) Date of Patent: Apr. 12, 2011

(54) MAGNETIC HEAD FOR PERPENDICULAR MAGNETIC RECORDING AND METHOD OF MANUFACTURING SAME

(75) Inventors: Yoshitaka Sasaki, Milpitas, CA (US); Hiroyuki Itoh, Milpitas, CA (US); Hironori Araki, Milpitas, CA (US); Shigeki Tanemura, Milpitas, CA (US); Kazuo Ishizaki, Milpitas, CA (US); Takehiro Horinaka, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 855 days.

(21) Appl. No.: 11/896,705

(22) Filed: Sep. 5, 2007

(65) Prior Publication Data
US 2009/0059426 A1 Mar. 5, 2009

(51) Int. Cl.
*G11B 5/31* (2006.01)
(52) U.S. Cl. ............. 360/125.15; 360/125.13; 29/603.15
(58) Field of Classification Search ............. 360/125.03, 360/125.09, 125.11, 125.13, 125.15; 29/603.15, 29/603.16, 603.18
See application file for complete search history.

(56) References Cited

U.S. PATENT DOCUMENTS

| | | | |
|---|---|---|---|
| 6,504,675 B1 | 1/2003 | Shukh et al. | |
| 7,061,719 B2 | 6/2006 | Matono et al. | |
| 7,133,252 B2 * | 11/2006 | Takano et al. | 360/125.13 |
| 7,193,815 B1 * | 3/2007 | Stoev et al. | 360/125.12 |
| 7,248,437 B2 | 7/2007 | Yazawa et al. | |
| 7,324,304 B1 * | 1/2008 | Benakli et al. | 360/125.33 |
| 7,433,151 B2 | 10/2008 | Sasaki et al. | |
| 7,443,633 B2 * | 10/2008 | Tagami et al. | 360/125.5 |
| 7,457,080 B2 * | 11/2008 | Watabe et al. | 360/125.12 |
| 7,545,603 B2 * | 6/2009 | Kameda et al. | 360/125.03 |
| 7,646,564 B2 * | 1/2010 | Maruyama et al. | 360/125.07 |
| 7,663,839 B2 * | 2/2010 | Sasaki et al. | 360/125.03 |
| 7,667,927 B2 * | 2/2010 | Kobayashi et al. | 360/123.06 |
| 7,715,152 B2 * | 5/2010 | Okada et al. | 360/319 |
| 7,796,360 B2 * | 9/2010 | Im et al. | 360/125.13 |
| 2002/0034043 A1 | 3/2002 | Okada et al. | |

(Continued)

FOREIGN PATENT DOCUMENTS

JP A-2004-139663 5/2004

(Continued)

OTHER PUBLICATIONS

Yoshitaka Sasaki et al., U.S. Appl. No. 11/812,757, filed Jun. 21, 2007.

*Primary Examiner* — William J Klimowicz
(74) *Attorney, Agent, or Firm* — Oliff & Berridge, PLC

(57) ABSTRACT

A top surface of a pole layer of a magnetic head includes: a first portion having a first edge located in a medium facing surface and a second edge opposite thereto; and a second portion located farther from the medium facing surface than the first portion and connected to the first portion at the second edge. The distance from a substrate to an arbitrary point on the first portion increases with increasing distance from the medium facing surface to the arbitrary point. The angle of inclination of the first portion taken at the arbitrary point with respect to a direction perpendicular to the medium facing surface increases stepwise or continuously with increasing distance from the medium facing surface to the arbitrary point. The angle of inclination taken at the first edge is greater than zero degree. The second portion extends in a direction substantially perpendicular to the medium facing surface.

33 Claims, 17 Drawing Sheets

U.S. PATENT DOCUMENTS

| | | |
|---|---|---|
| 2003/0151850 A1 | 8/2003 | Nakamura et al. |
| 2004/0150910 A1* | 8/2004 | Okada et al. .................. 360/125 |
| 2005/0190491 A1* | 9/2005 | Le et al. ........................ 360/122 |
| 2005/0219743 A1 | 10/2005 | Guan et al. |
| 2005/0219747 A1 | 10/2005 | Hsu et al. |
| 2005/0237665 A1* | 10/2005 | Guan et al. .................... 360/125 |
| 2006/0132972 A1* | 6/2006 | Tagami et al. ................. 360/126 |
| 2006/0256471 A1* | 11/2006 | Plumer et al. ................. 360/122 |
| 2006/0256483 A1 | 11/2006 | Sasaki et al. |
| 2007/0097548 A1* | 5/2007 | Taguchi ........................ 360/126 |
| 2007/0188918 A1* | 8/2007 | Im et al. ........................ 360/126 |
| 2008/0316653 A1* | 12/2008 | Sasaki et al. .................. 360/319 |

FOREIGN PATENT DOCUMENTS

| | | |
|---|---|---|
| JP | A-2005-71429 | 3/2005 |
| JP | A-2005-302281 | 10/2005 |
| JP | A-2006-190438 | 7/2006 |
| JP | A-2006-323984 | 11/2006 |

* cited by examiner

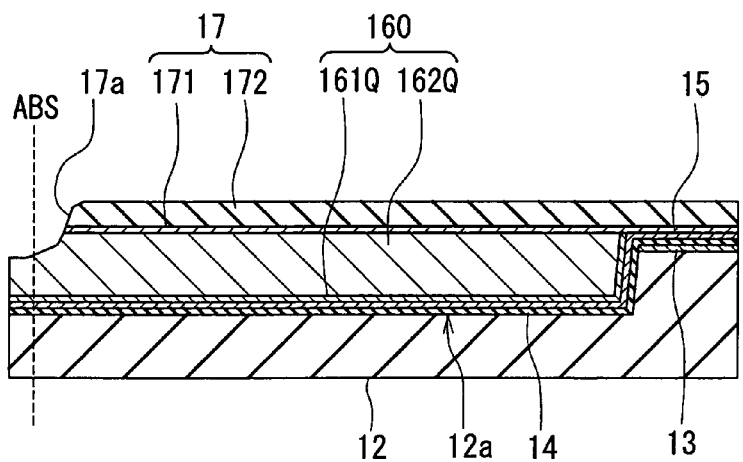 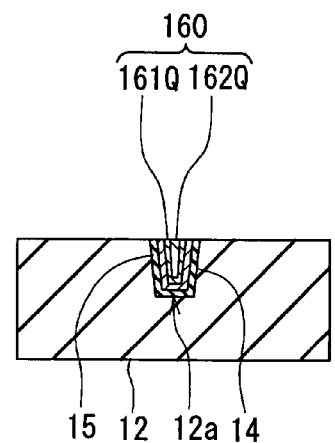
FIG. 13A  FIG. 13B
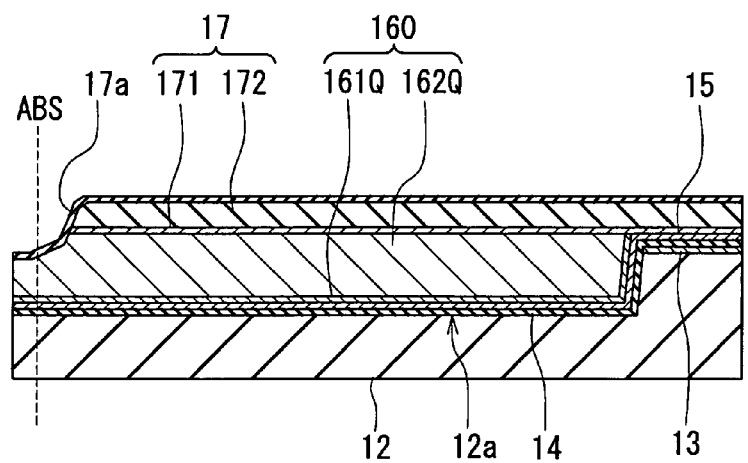 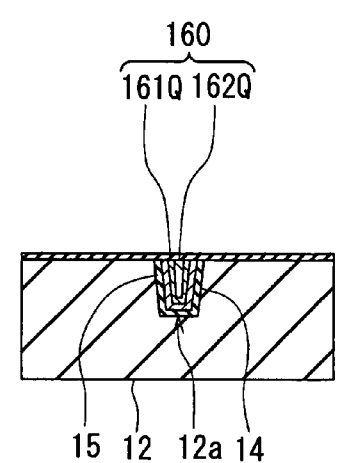
FIG. 14A  FIG. 14B

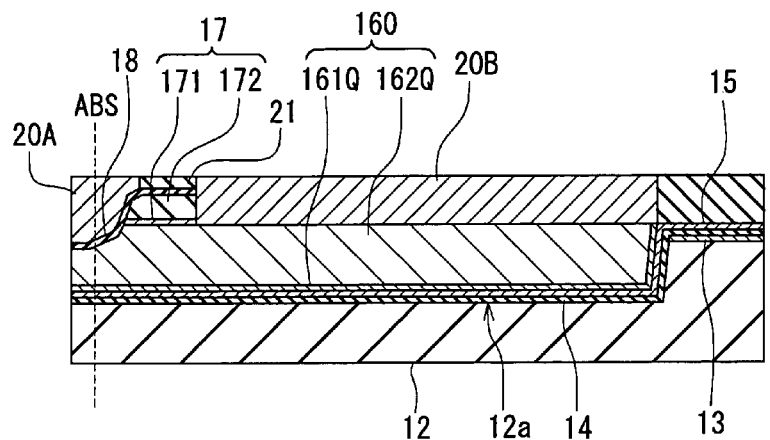 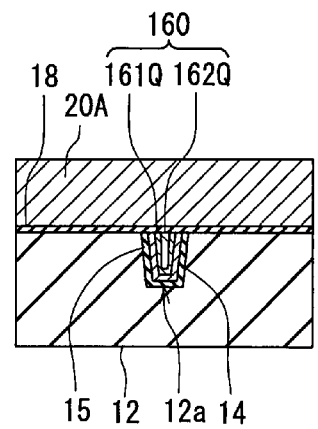
FIG. 15A  FIG. 15B
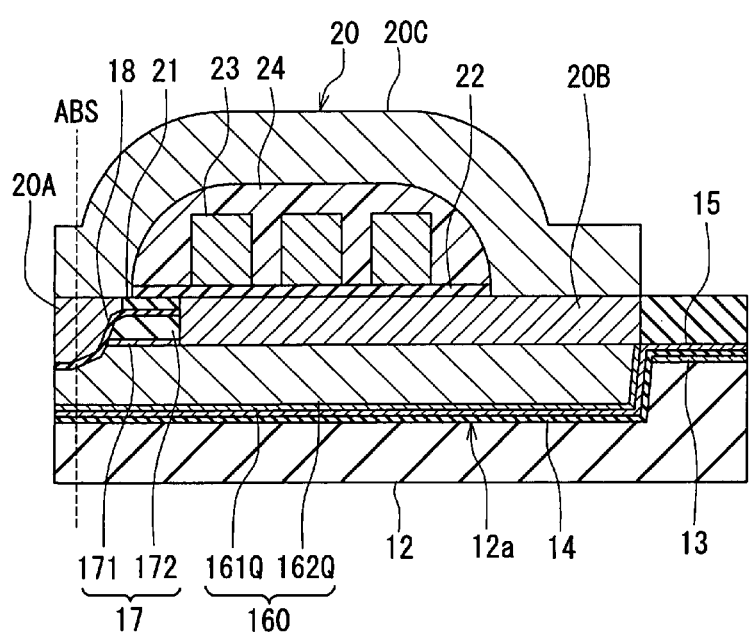 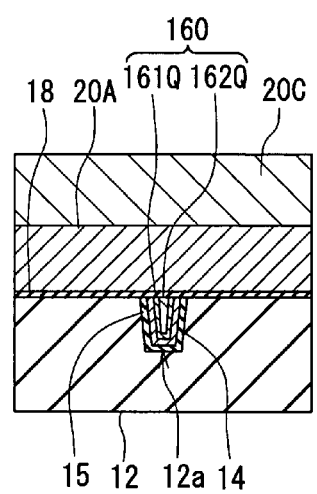
FIG. 16A  FIG. 16B

MAGNETIC HEAD FOR PERPENDICULAR MAGNETIC RECORDING AND METHOD OF MANUFACTURING SAME

BACKGROUND OF THE INVENTION

1. Field of the Invention

The present invention relates to a magnetic head for perpendicular magnetic recording that is used for writing data on a recording medium by means of a perpendicular magnetic recording system, and to a method of manufacturing such a magnetic head.

2. Description of the Related Art

The recording systems of magnetic read/write devices include a longitudinal magnetic recording system wherein signals are magnetized in the direction along the surface of the recording medium (the longitudinal direction) and a perpendicular magnetic recording system wherein signals are magnetized in a direction perpendicular to the plane of the recording medium. It is known that the perpendicular magnetic recording system is harder to be affected by thermal fluctuation of the recording medium and capable of implementing higher linear recording density, compared with the longitudinal magnetic recording system.

Typically, magnetic heads for perpendicular magnetic recording have a structure in which a reproducing (read) head having a magnetoresistive element (that may be hereinafter referred to an MR element) for reading and a recording (write) head having an induction-type electromagnetic transducer for writing are stacked on a substrate, as is the case with magnetic heads for longitudinal magnetic recording. The write head includes a pole layer that produces a magnetic field in the direction perpendicular to the plane of the recording medium. The pole layer includes, for example, a track width defining portion having an end located in a medium facing surface that faces toward the recording medium, and a wide portion that is coupled to the other end of the track width defining portion and that is greater in width than the track width defining portion. The track width defining portion has a nearly uniform width.

For the perpendicular magnetic recording system, it is an improvement in recording medium and an improvement in write head that mainly contributes to an improvement in recording density. It is a reduction in track width and an improvement in write characteristics that is particularly required for the write head to achieve higher recording density. On the other hand, if the track width is reduced, the write characteristics, such as an overwrite property that is a parameter indicating an overwriting capability, suffer degradation. It is therefore required to achieve better write characteristics with decreasing track width. Here, the length of the track width defining portion taken in the direction perpendicular to the medium facing surface is called a neck height. The smaller the neck height, the better is the overwrite property.

However, as the neck height gets smaller, it becomes difficult to precisely define the track width. The reason is as follows. It is difficult to precisely form a portion of the side surface of the pole layer near the boundary between the track width defining portion and the wide portion. It is therefore likely that the portion of the pole layer near the boundary between the track width defining portion and the wide portion has such a shape that the width gradually increases with increasing distance from the medium facing surface. As a result, as the neck height gets smaller, it becomes difficult to precisely define the width of the end of the track width defining portion located in the medium facing surface, that is, the track width.

A magnetic head for use in a magnetic disk drive such as a hard disk drive is typically provided in a slider. The slider has the medium facing surface mentioned above. The medium facing surface has an air-inflow-side end and an air-outflow-side end. The slider is designed to slightly fly over the surface of the recording medium by means of an airflow that comes from the air-inflow-side end into the space between the medium facing surface and the recording medium. The magnetic head is typically disposed near the air-outflow-side end of the medium facing surface of the slider. In a magnetic disk drive, the magnetic head is aligned through the use of a rotary actuator, for example. In this case, the magnetic head moves over the recording medium along a circular orbit centered on the center of rotation of the rotary actuator. In such a magnetic disk drive, a tilt of the magnetic head with respect to the tangent of the circular track, which is called a skew, occurs in accordance with the position of the magnetic head across the tracks.

In a magnetic disk drive of the perpendicular magnetic recording system, in particular, which exhibits a better capability of writing on a recording medium compared with the longitudinal magnetic recording system, if the above-mentioned skew occurs, there arise problems such as a phenomenon in which, when data is written on a certain track, data stored on a track adjacent thereto is erased (this is hereinafter called adjacent track erasing), or unwanted writing performed between two adjacent tracks. To achieve higher recording density, it is required to suppress adjacent track erasing. Unwanted writing between two adjacent tracks affects detection of servo signals for alignment of the magnetic head and the signal-to-noise ratio of a read signal.

As one of techniques for preventing the problems resulting from the skew described above, there is known a technique in which the end face of the track width defining portion located in the medium facing surface is formed into such a shape that the side located backward along the direction of travel of the recording medium (that is, the side located closer to the air inflow end of the slider) is shorter than the opposite side, as disclosed in U.S. Patent Application Publication No. US2003/0151850 A1 and U.S. Pat. No. 6,504,675 B1, for example. For magnetic heads, typically, in the medium facing surface, the end farther from the substrate is located forward along the direction of travel of the recording medium (that is, located closer to the air outflow end of the slider). Therefore, the shape of the end face of the track width defining portion located in the medium facing surface mentioned above is such that the side closer to the substrate is shorter than the side farther from the substrate.

As a magnetic head for perpendicular magnetic recording, there is known a magnetic head including a shield, as disclosed in U.S. Patent Application Publication No. 2005/0219747 A1, for example, wherein the shield has an end face located in the medium facing surface at a position forward of the end face of the pole layer along the direction of travel of the recording medium with a predetermined distance provided therebetween. A gap layer made of a nonmagnetic material is provided between the pole layer and the shield. The shield has a function of preventing a magnetic flux from reaching the recording medium, the flux being generated from the end face of the pole layer and expanding in directions except the direction perpendicular to the plane of the recording medium. A magnetic head including such a shield enables a further improvement in recording density.

U.S. Patent Application Publication No. US2002/0034043 A1 discloses a technique in which a portion of the pole layer (the main pole) located near the medium facing surface is made to have a thickness that decreases with decreasing distance from the medium facing surface.

To solve the problems resulting from the skew, it is also effective to reduce the thickness of the track width defining portion taken in the medium facing surface. If the entire pole layer is made thin, however, a cross-sectional area of the pole layer perpendicular to the direction in which magnetic flux flows is reduced. As a result, the pole layer becomes unable to introduce magnetic flux of great magnitude to the medium facing surface, and this leads to degradation of overwrite property.

To cope with this, as disclosed in U.S. Patent Application Publication No. US2002/0034043 A1, a portion of the pole layer near the medium facing surface can be made smaller in thickness than the other portion of the pole layer. It is thereby possible to reduce the thickness of the track width defining portion taken in the medium facing surface and to introduce magnetic flux of great magnitude to the medium facing surface through the pole layer. In this case, however, the following problem can occur. That is, according to the technique described above, it is inevitable that the pole layer has a portion in which the thickness abruptly changes when seen in a direction perpendicular to the medium facing surface. In the portion in which the thickness abruptly changes, flux leakage from the pole layer is likely to occur. If the portion in which the thickness abruptly changes is close to the medium facing surface, magnetic flux leaking from this portion reaches the medium facing surface and further leaks to the outside from the medium facing surface. As a result, the effective track width can increase and the foregoing problems resulting from the skew can occur.

In the magnetic head disclosed in U.S. Patent Application Publication No. 2005/0219747 A1, a surface of the pole layer closer to the shield has a tapered surface portion. In this magnetic head, the point at which the tapered surface portion starts, when seen from the medium facing surface, is located away from the medium facing surface. A portion of this surface of the pole layer closer to the shield, the portion extending from the medium facing surface to the point at which the tapered surface portion starts, is perpendicular to the medium facing surface. As a result, when seen in the direction perpendicular to the medium facing surface, a region of the pole layer from the medium facing surface to the point at which the tapered surface portion starts has a uniform thickness, while a region of the pole layer from the point at which the tapered surface portion starts to the point at which the tapered surface portion terminates has a thickness that increases with increasing distance from the medium facing surface.

Here, a consideration is given to a magnetic head in which the pole layer has: a first portion having a uniform thickness and including a first end located in the medium facing surface and a second end located away from the medium facing surface; and a second portion coupled to the second end of the first portion and having a thickness greater than that of the first portion. An example of such a magnetic head is the one disclosed in U.S. Patent Application Publication No. 2005/0219747 A1.

In the case where the pole layer has the first portion and the second portion described above, the cross-sectional area of the pole layer perpendicular to the direction in which magnetic flux flows is smaller in the entire first portion. Consequently, if the distance from the medium facing surface to the boundary between the first and the second portion is great, the pole layer is unable to introduce magnetic flux of great magnitude to the medium facing surface. On the other hand, if the distance from the medium facing surface to the boundary between the first and the second portion is small, a problem described below can occur. First, note that the distance from the medium facing surface to the boundary between the first and the second portion can vary due to a variation in the position of the boundary between the first and the second portion that can occur when the pole layer is formed, and/or due to a variation in the position of the medium facing surface that can occur when the medium facing surface is formed by polishing. Here, the distance from the medium facing surface to the boundary between the first and the second portion has an influence on write characteristics. If the distance from the medium facing surface to the boundary between the first and the second portion is small, a slight variation in this distance would cause a great variation in write characteristics.

For the foregoing reasons, conventionally, it has been difficult to prevent the problems resulting from the skew and to improve the write characteristics.

OBJECT AND SUMMARY OF THE INVENTION

It is an object of the present invention to provide a magnetic head for perpendicular magnetic recording that is capable of preventing the problems resulting from the skew and attaining improved write characteristics, and to provide a method of manufacturing such a magnetic head.

A magnetic head for perpendicular magnetic recording of the present invention includes: a medium facing surface that faces toward a recording medium; a coil for generating a magnetic field corresponding to data to be written on the recording medium; a pole layer having an end face located in the medium facing surface, the pole layer allowing a magnetic flux corresponding to the magnetic field generated by the coil to pass therethrough and generating a write magnetic field for writing the data on the recording medium by means of a perpendicular magnetic recording system; a shield made of a magnetic material and having an end face located in the medium facing surface at a position forward of the end face of the pole layer along a direction of travel of the recording medium; a gap layer that is made of a nonmagnetic material, has an end face located in the medium facing surface, and is disposed between the pole layer and the shield; and a substrate on which the coil, the pole layer, the gap layer and the shield are stacked.

In the magnetic head of the invention, the pole layer is disposed closer to the substrate than is the shield. The end face of the pole layer located in the medium facing surface has a first side closer to the substrate, and a second side opposite to the first side, the second side defining the track width. The pole layer has a top surface that is farther from the substrate. The top surface of the pole layer includes: a first portion having a first edge located in the medium facing surface and a second edge opposite thereto; and a second portion located farther from the medium facing surface than the first portion and connected to the first portion at the second edge. The first edge coincides with the second side. A distance from the substrate to an arbitrary point on the first portion increases with increasing distance from the medium facing surface to the arbitrary point. The first portion has an angle of inclination with respect to a direction perpendicular to the medium facing surface, and the angle of inclination taken at the arbitrary point increases stepwise or continuously with increasing distance from the medium facing surface to the arbitrary point. The angle of inclination taken at the first edge is greater than zero degree. The second portion extends in a direction substantially perpendicular to the medium facing surface.

In the magnetic head of the invention, the first portion may include: a first flat surface portion including the first edge and having a specific first angle of inclination; and a second flat surface portion including the second edge and having a specific second angle of inclination greater than the first angle of inclination. The first angle of inclination may be within a range of 15 to 40 degrees while the second angle of inclination may be within a range of 40 to 75 degrees. Alternatively, the first angle of inclination may be within the range of 15 to 40 degrees while the second angle of inclination may be 90 degrees.

The magnetic head of the invention may further include a nonmagnetic layer made of a nonmagnetic material and disposed on the second portion. The nonmagnetic layer may have a bottom surface touching the second portion, and the bottom surface may have an edge located at the second edge. In this case, the gap layer may be disposed on the pole layer and the nonmagnetic layer, the shield may have a bottom surface touching the gap layer, and the bottom surface of the shield may bend to be opposed to the pole layer and the nonmagnetic layer with the gap layer in between.

In the magnetic head of the invention, the nonmagnetic layer may have a front end face that faces toward the medium facing surface, and a distance from the medium facing surface to an arbitrary point on the front end face may increase with increasing distance from the substrate to the point. In this case, the front end face may have an angle of inclination within a range of 40 to 75 degrees with respect to the direction perpendicular to the medium facing surface.

In the magnetic head of the invention, the nonmagnetic layer may have a front end face that faces toward the medium facing surface, and the front end face may be a flat surface that is substantially parallel to the medium facing surface.

In the magnetic head of the invention, the end face of the pole layer located in the medium facing surface may have a width that decreases with decreasing distance from the first side.

In the magnetic head of the invention, the nonmagnetic layer may include a layer made of an inorganic insulating material, or may include a layer made of a metal material.

In the magnetic head of the invention, the nonmagnetic layer may include: a first layer made of a metal material and disposed on the second portion; and a second layer made of an inorganic insulating material and disposed on the first layer. In this case, the first layer may be made of Ru, NiCr or NiCu, while the second layer may be made of $Al_2O_3$ or a silicon oxide.

In the magnetic head of the invention, the shield may be connected to the pole layer at a position away from the medium facing surface, and the coil may include a portion that passes through a space surrounded by the pole layer and the shield.

A method of manufacturing the magnetic head for perpendicular magnetic recording of the present invention includes the steps of: forming a magnetic layer that is to undergo partial etching later and that is to become the pole layer when the medium facing surface is formed; forming the nonmagnetic layer on the magnetic layer; partially etching the magnetic layer using the nonmagnetic layer as a mask so that two portions are formed in a top surface of the magnetic layer, the two portions being intended to become the first portion and the second portion later when the medium facing surface is formed; forming the gap layer on the magnetic layer and the nonmagnetic layer; forming the shield on the gap layer; forming the coil; and forming the medium facing surface so that the magnetic layer becomes the pole layer.

In the method of manufacturing the magnetic head of the invention, the first portion may include: a first flat surface portion including the first edge and having a specific first angle of inclination; and a second flat surface portion including the second edge and having a specific second angle of inclination greater than the first angle of inclination. The first angle of inclination may be within a range of 15 to 40 degrees while the second angle of inclination may be within a range of 40 to 75 degrees. Alternatively, the first angle of inclination may be within the range of 15 to 40 degrees while the second angle of inclination may be 90 degrees.

In the method of manufacturing the magnetic head of the invention, the gap layer may be disposed on the pole layer and the nonmagnetic layer, the shield may have a bottom surface touching the gap layer, and the bottom surface of the shield may bend to be opposed to the pole layer and the nonmagnetic layer with the gap layer in between.

In the method of manufacturing the magnetic head of the invention, the nonmagnetic layer may have a front end face that faces toward the medium facing surface, and a distance from the medium facing surface to an arbitrary point on the front end face may increase with increasing distance from the substrate to the point. In this case, the front end face may have an angle of inclination within a range of 40 to 75 degrees with respect to the direction perpendicular to the medium facing surface. Furthermore, in this case, in the step of partially etching the magnetic layer, the magnetic layer may be partially etched by ion beam etching such that the direction of travel of an ion beam forms an angle within a range of 45 to 55 degrees with respect to a direction perpendicular to the top surface of the substrate, and that the direction of travel of the ion beam rotates when seen in the direction perpendicular to the top surface of the substrate.

In the method of manufacturing the magnetic head of the invention, the nonmagnetic layer may have a front end face that faces toward the medium facing surface, and the front end face may be a flat surface that is substantially parallel to the medium facing surface. In this case, in the step of partially etching the magnetic layer, the magnetic layer may be partially etched by ion beam etching such that the direction of travel of an ion beam forms an angle within a range of 40 to 50 degrees with respect to a direction perpendicular to the top surface of the substrate, and that the direction of travel of the ion beam rotates when seen in the direction perpendicular to the top surface of the substrate.

In the method of manufacturing the magnetic head of the invention, the end face of the pole layer located in the medium facing surface may have a width that decreases with decreasing distance from the first side.

In the method of manufacturing the magnetic head of the invention, the nonmagnetic layer may include a layer made of an inorganic insulating material, or may include a layer made of a metal material.

In the method of manufacturing the magnetic head of the invention, the nonmagnetic layer may include: a first layer made of a metal material and disposed on the second portion; and a second layer made of an inorganic insulating material and disposed on the first layer. In this case, the step of forming the nonmagnetic layer may include the steps of: forming a first film on the magnetic layer, the first film being intended to become the first layer later by being etched partially; forming a second film on the first film, the second film being intended to become the second layer later by being etched partially; partially etching the second film by reactive ion etching so that the second film becomes the second layer; and partially etching the first film by ion beam etching, with the second layer used as a mask, so that the first film becomes the first layer. In this case, the first layer may be made of Ru, NiCr or NiCu, while the second layer may be made of $Al_2O_3$ or a silicon oxide.

In the method of manufacturing the magnetic head of the invention, the shield may be connected to the pole layer at a position away from the medium facing surface, and the coil may include a portion that passes through a space surrounded by the pole layer and the shield.

In the method of manufacturing the magnetic head of the invention, the gap layer may be formed by chemical vapor deposition in which formation of a single atomic layer is repeated.

In the method of manufacturing the magnetic head of the invention, in the step of forming the magnetic layer, an indicator may be formed, the indicator being intended to be used later as a reference when the position of the edge of the bottom surface of the nonmagnetic layer is determined, and, in the step of forming the nonmagnetic layer, the position of the edge of the bottom surface of the nonmagnetic layer may be determined with the indicator used as the reference.

According to the magnetic head for perpendicular magnetic recording or the method of manufacturing the same of the present invention, the top surface of the pole layer includes the first portion and the second portion, and the distance from the substrate to an arbitrary point on the first portion increases with increasing distance from the medium facing surface to the arbitrary point. The angle of inclination of the first portion taken at the arbitrary point with respect to the direction perpendicular to the medium facing surface increases stepwise or continuously with increasing distance from the medium facing surface to the arbitrary point. The angle of inclination taken at the first edge is greater than zero degree. As a result, according to the present invention, it is possible to prevent the problems resulting from the skew, and to improve the write characteristics by introducing magnetic flux of great magnitude to the medium facing surface through the pole layer. According to the present invention, the angle of inclination of the first portion taken at an arbitrary point on the first portion with respect to the direction perpendicular to the medium facing surface increases stepwise or continuously with increasing distance from the medium facing surface to the arbitrary point. Consequently, according to the present invention, a variation in write characteristics that would occur in response to a variation in the position of the medium facing surface is moderate.

Other objects, features and advantages of the present invention will become fully apparent from the following description.

BRIEF DESCRIPTION OF THE DRAWINGS

FIG. 13A and FIG. 13B are views for illustrating a step that follows the step of FIG. 12A and FIG. 12B.

FIG. 14A and FIG. 14B are views for illustrating a step that follows the step of FIG. 13A and FIG. 13B.

FIG. 15A and FIG. 15B are views for illustrating a step that follows the step of FIG. 14A and FIG. 14B.

FIG. 16A and FIG. 16B are views for illustrating a step that follows the step of FIG. 15A and FIG. 15B.

DETAILED DESCRIPTION OF THE PREFERRED EMBODIMENTS

First Embodiment

Figure 4:
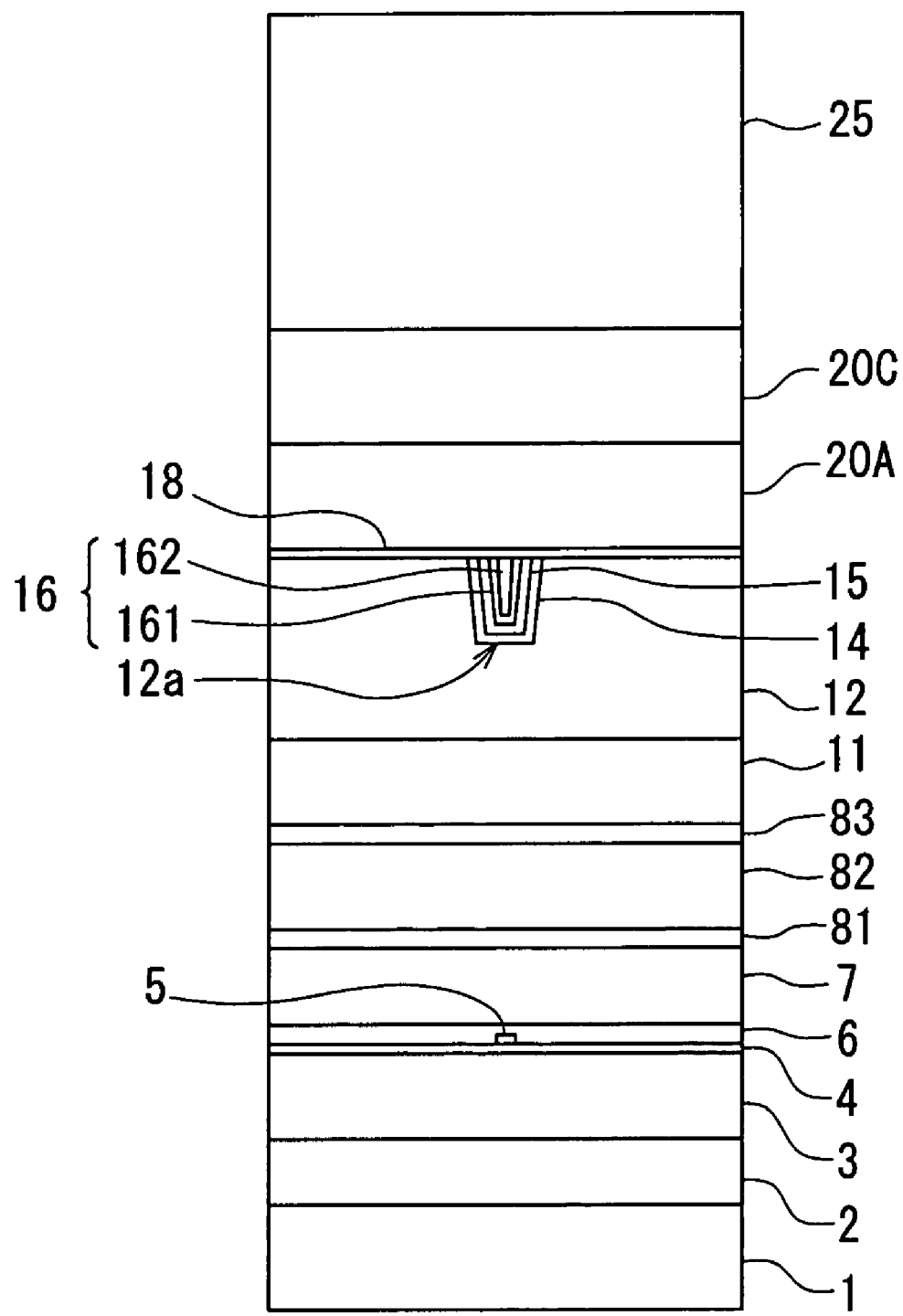
FIG. 4 is a front view of the medium facing surface of the magnetic head of the first embodiment of the invention.
Figure 5:
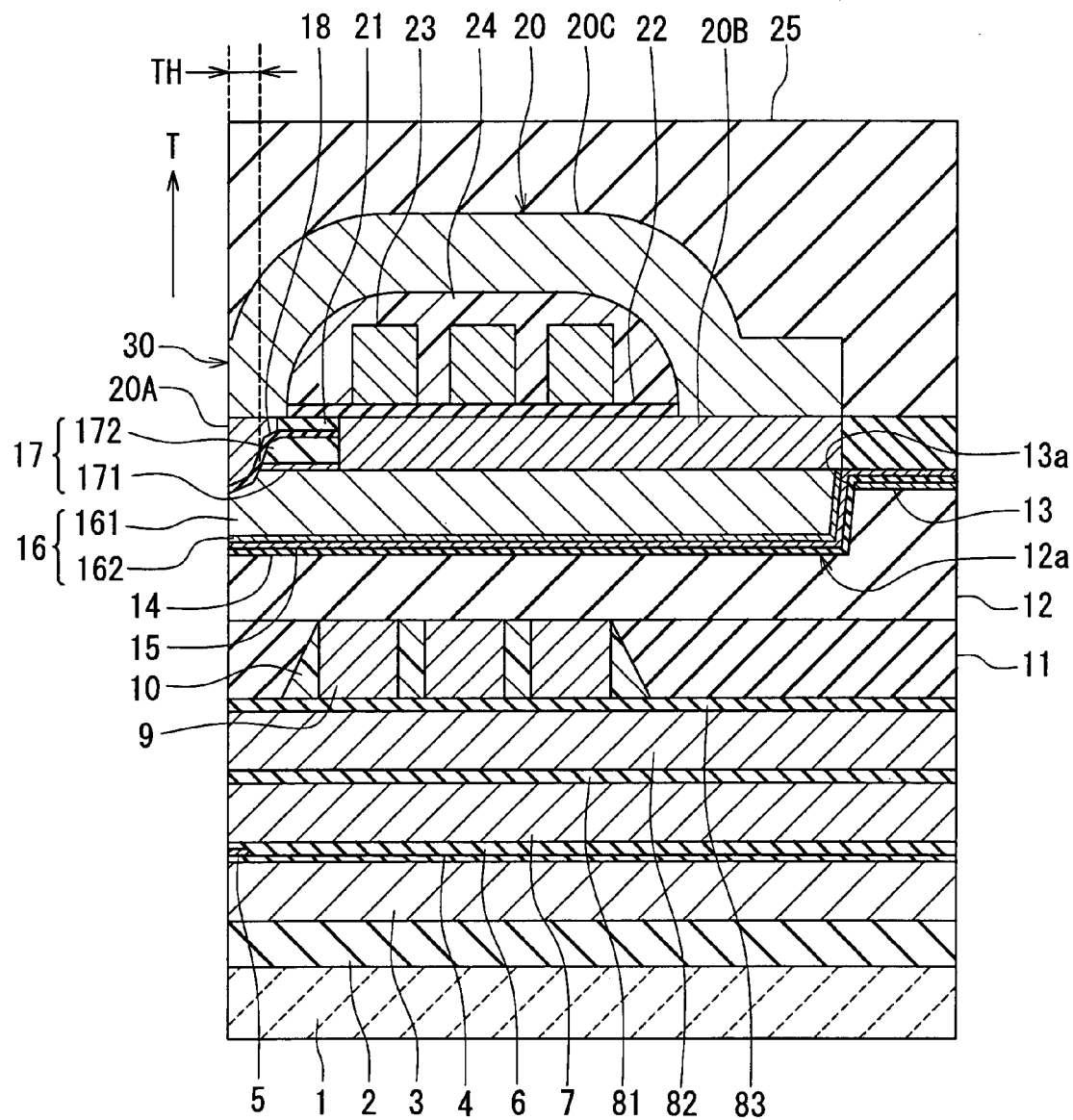
FIG. 5 is a cross-sectional view for illustrating the configuration of the magnetic head of the first embodiment of the invention.

Embodiments of the present invention will now be described in detail with reference to the drawings. Reference is first made to FIG. 4 and FIG. 5 to describe the configuration of a magnetic head for perpendicular magnetic recording of a first embodiment of the invention. FIG. 4 is a front view of the medium facing surface of the magnetic head for perpendicular magnetic recording of the embodiment. FIG. 5 is a cross-sectional view for illustrating the configuration of the magnetic head for perpendicular magnetic recording of the embodiment. FIG. 5 illustrates a cross section perpendicular to the medium facing surface and the top surface of the substrate. In FIG. 5 the arrow marked with T shows the direction of travel of a recording medium.

As illustrated in FIG. 4 and FIG. 5, the magnetic head for perpendicular magnetic recording (hereinafter simply called the magnetic head) of the embodiment includes: a substrate 1 made of a ceramic material such as aluminum oxide and titanium carbide ($Al_2O_3$—TiC); an insulating layer 2 made of an insulating material such as alumina ($Al_2O_3$) and disposed on the substrate 1; a bottom shield layer 3 made of a magnetic material and disposed on the insulating layer 2; a bottom shield gap film 4 that is an insulating film disposed on the bottom shield layer 3; a magnetoresistive (MR) element 5 as a read element disposed on the bottom shield gap film 4; a top shield gap film 6 that is an insulating film disposed on the MR element 5; and a first top shield layer 7 made of a magnetic material and disposed on the top shield gap film 6.

An end of the MR element 5 is located in the medium facing surface 30 that faces toward the recording medium. The MR element 5 may be an element made of a magneto-sensitive film that exhibits a magnetoresistive effect, such as an AMR (anisotropic magnetoresistive) element, a GMR (giant magnetoresistive) element, or a TMR (tunneling magnetoresistive) element. The GMR element may be of a CIP (current-in-plane) type wherein a current used for detecting magnetic signals is fed in a direction nearly parallel to the planes of layers constituting the GMR element, or may be of a CPP (current-perpendicular-to-plane) type wherein a current used for detecting magnetic signals is fed in a direction nearly perpendicular to the planes of the layers constituting the GMR element.

The magnetic head further includes a nonmagnetic layer 81 and a second top shield layer 82 that are disposed in this order on the first top shield layer 7. The nonmagnetic layer 81 is made of a nonmagnetic material such as alumina. The second top shield layer 82 is made of a magnetic material. The portion from the bottom shield layer 3 to the second top shield layer 82 makes up a read head.

The magnetic head further includes: an insulating layer 83 made of an insulating material and disposed on the second top shield layer 82; a coil 9 disposed on the insulating layer 83; an insulating layer 10 made of an insulating material and disposed around the coil 9 and in the space between the respective adjacent turns of the coil 9; and an insulating layer 11 made of an insulating material and disposed around the insulating layer 10. The coil 9 is planar spiral-shaped. The coil 9 and the insulating layers 10 and 11 have flattened top surfaces. The insulating layers 83 and 11 are made of alumina, for example. The insulating layer 10 is made of photoresist, for example. The coil 9 is made of a conductive material such as copper.

The magnetic head further includes an encasing layer 12 made of a nonmagnetic material and disposed on the flattened top surfaces of the coil 9 and the insulating layers 10 and 11. The encasing layer 12 has a groove 12a that opens in the top surface of the encasing layer 12 and that accommodates at least part of a pole layer described later. The encasing layer 12 may be made of an insulating material such as alumina, a silicon oxide ($SiO_x$) or a silicon oxynitride (SiON), or a nonmagnetic metal material such as Ru, Ta, Mo, Ti, W, NiCu, NiB or NiP.

The magnetic head further includes a nonmagnetic metal layer 13 made of a nonmagnetic metal material and disposed on the top surface of the encasing layer 12. The nonmagnetic metal layer 13 has a penetrating opening 13a, and the edge of the opening 13a is located directly above the edge of the groove 12a in the top surface of the encasing layer 12. The nonmagnetic metal layer 13 can be made of any of Ta, Mo, W, Ti, Ru, Rh, Re, Pt, Pd, Ir, NiCr, NiP, NiB, $WSi_2$, $TaSi_2$, $TiSi_2$, TiN, and TiW, for example.

The magnetic head further includes a nonmagnetic film 14, a polishing stopper layer 15 and the pole layer 16 that are disposed in the groove 12a of the encasing layer 12 and in the opening 13a of the nonmagnetic metal layer 13. The nonmagnetic film 14 is disposed to touch the surface of the groove 12a. The pole layer 16 is disposed apart from the surface of the groove 12a. The polishing stopper layer 15 is disposed between the nonmagnetic film 14 and the pole layer 16. The polishing stopper layer 15 also functions as a seed layer used for forming the pole layer 16 by plating. The pole layer 16 includes: a first layer 161 located closer to the surface of the groove 12a; and a second layer 162 located farther from the surface of the groove 12a. The first layer 161 may be dispensed with, however.

The nonmagnetic film 14 is made of a nonmagnetic material. The material of the nonmagnetic film 14 may be an insulating material or a semiconductor material, for example. The insulating material as the material of the nonmagnetic film 14 may be any of alumina, a silicon oxide ($SiO_x$) and a silicon oxynitride (SiON), for example. The semiconductor material as the material of the nonmagnetic film 14 may be polycrystalline silicon or amorphous silicon, for example.

The polishing stopper layer 15 is made of a nonmagnetic conductive material. The material of the polishing stopper layer 15 may be the same as that of the nonmagnetic metal layer 13.

The first layer 161 and the second layer 162 are each made of a magnetic metal material. The first layer 161 may be made of any of CoFeN, CoNiFe, NiFe and CoFe, for example. The second layer 162 may be made of any of NiFe, CoNiFe and CoFe, for example. The shape of the pole layer 16 will be described in detail later.

The magnetic head further includes a nonmagnetic layer 17 made of a nonmagnetic material and disposed on part of the top surface of the pole layer 16. The nonmagnetic layer 17 may include a layer made of an inorganic insulating material, or may include a layer made of a metal material. In the example illustrated in FIG. 5, the nonmagnetic layer 17 includes a first layer 171 that is made of a metal material and disposed on part of the top surface of the pole layer 16, and a second layer 172 that is made of an inorganic insulating material and disposed on the first layer 171. The metal material used to form the first layer 171 may be Ru, NiCr or NiCu, for example. The inorganic insulating material used to form the second layer 172 may be $Al_2O_3$ or a silicon oxide, for example. The shape of the nonmagnetic layer 17 will be described in detail later.

The magnetic head further includes a gap layer 18 disposed on the nonmagnetic metal layer 13, the nonmagnetic film 14, the polishing stopper layer 15, the pole layer 16 and the nonmagnetic layer 17. A portion of the top surface of the pole layer 16 away from the medium facing surface 30 is not covered with the nonmagnetic layer 17 and the gap layer 18. The gap layer 18 may be made of an insulating material such as alumina or a nonmagnetic metal material such as Ru, NiCu, Ta, W, NiB or NiP.

The magnetic head further includes a shield 20. The shield 20 includes: a first layer 20A disposed on the gap layer 18; a yoke layer 20B disposed on part of the top surface of the pole layer 16 away from the medium facing surface 30; and a second layer 20C that couples the first layer 20A and the yoke layer 20B to each other. Each of the first layer 20A and the second layer 20C has an end face located in the medium facing surface 30. The first layer 20A, the yoke layer 20B and the second layer 20C are each made of a magnetic material. These layers 20A to 20C may be made of any of CoFeN, CoNiFe, NiFe and CoFe, for example.

The magnetic head further includes a nonmagnetic layer 21 made of a nonmagnetic material and disposed around the first layer 20A and the yoke layer 20B. The nonmagnetic layer 21 is made of an inorganic insulating material such as alumina or coating glass. Alternatively, the nonmagnetic layer 21 may be made up of a layer of a nonmagnetic metal material and a layer of an insulating material disposed thereon. In this case, the nonmagnetic metal material may be a refractory metal such as Ta, Mo, Nb, W, Cr, Ru, NiCu, Pd, or Hf, for example.

The magnetic head further includes: an insulating layer 22 disposed on regions of the top surfaces of the yoke layer 20B and the nonmagnetic layer 21 in which a coil 23 described later is to be disposed; the coil 23 disposed on the insulating layer 22; and an insulating layer 24 to cover the coil 23. The insulating layer 22 is made of alumina, for example. The coil 23 is planar spiral-shaped. Part of the coil 23 passes between the second layer 20C and the yoke layer 20B. The coil 23 is made of a conductive material such as copper. The insulating layer 24 is made of photoresist, for example. The magnetic head further includes a protection layer 25 made of an insulating material such as alumina and disposed to cover the second layer 20C. The portion from the coil 9 to the second layer 20C of the shield 20 makes up a write head.

As described so far, the magnetic head of the embodiment includes the medium facing surface 30 that faces toward the recording medium, the read head, and the write head. The read head and the write head are stacked on the substrate 1. The read head is disposed backward along the direction T of travel of the recording medium (that is, disposed closer to the air inflow end of the slider), while the write head is disposed forward along the direction T of travel of the recording medium (that is, disposed closer to the air outflow end of the slider).

The read head includes: the MR element 5 as the read element; the bottom shield layer 3 and the top shield layer 7 for shielding the MR element 5, the shield layers 3 and 7 having their respective portions that are located on a side of the medium facing surface 30 and that are opposed to each other with the MR element 5 in between; the bottom shield gap film 4 disposed between the MR element 5 and the bottom shield layer 3; and the top shield gap film 6 disposed between the MR element 5 and the top shield layer 7.

The write head includes the coil 9, the encasing layer 12, the nonmagnetic metal layer 13, the nonmagnetic film 14, the polishing stopper layer 15, the pole layer 16, the nonmagnetic layer 17, the gap layer 18, the shield 20, and the coil 23. The coils 9 and 23 generate a magnetic field corresponding to data to be written on the recording medium. The coil 9 is not an essential component of the write head and may be dispensed with. The nonmagnetic film 14 may also be dispensed with.

The pole layer 16 has an end face located in the medium facing surface 30, and a top surface that is farther from the substrate 1. The pole layer 16 allows a magnetic flux corresponding to the magnetic field generated by the coil 23 to pass therethrough and generates a write magnetic field for writing the data on the recording medium by means of the perpendicular magnetic recording system.

The shield 20 has an end face located in the medium facing surface 30, and is coupled to the pole layer 16 at a position away from the medium facing surface 30. The pole layer 16 is located closer to the substrate 1 than is the shield 20. The gap layer 18 is made of a nonmagnetic material, has an end face located in the medium facing surface 30, and is provided between the pole layer 16 and the shield 20.

In the medium facing surface 30, the end face of the shield 20 is disposed forward of the end face of the pole layer 16 along the direction T of travel of the recording medium with a predetermined distance provided therebetween by the thickness of the gap layer 18. The thickness of the gap layer 18 is within a range of 20 to 50 nm, for example. The coil 23 includes a portion that passes through the space surrounded by the pole layer 16 and the shield 20.

The pole layer 16 is disposed in the groove 12a of the encasing layer 12 and in the opening 13a of the nonmagnetic metal layer 13 with the nonmagnetic film 14 and the polishing stopper layer 15 disposed between the pole layer 16 and each of the groove 12a and the opening 13a. The nonmagnetic film 14 has a thickness within a range of 20 to 80 nm, for example. However, the thickness of the nonmagnetic film 14 is not limited to this range but may be of any other value, depending on the track width. The polishing stopper layer 15 has a thickness within a range of 20 to 80 nm, for example.

The pole layer 16 includes the first layer 161 located closer to the surface of the groove 12a, and the second layer 162 located farther from the surface of the groove 12a. The first layer 161 has a thickness within a range of 0 to 100 nm, for example. The zero thickness of the first layer 161 means that the first layer 161 is not provided.

The shield 20 includes the first layer 20A disposed adjacent to the gap layer 18, the yoke layer 20B disposed on part of the top surface of the pole layer 16 away from the medium facing surface 30, and the second layer 20C that couples the first layer 20A and the yoke layer 20B to each other. The second layer 20C includes a portion located on a side of part of the coil 23 covered with the insulating layer 24 farther from the pole layer 16.

Figure 1:
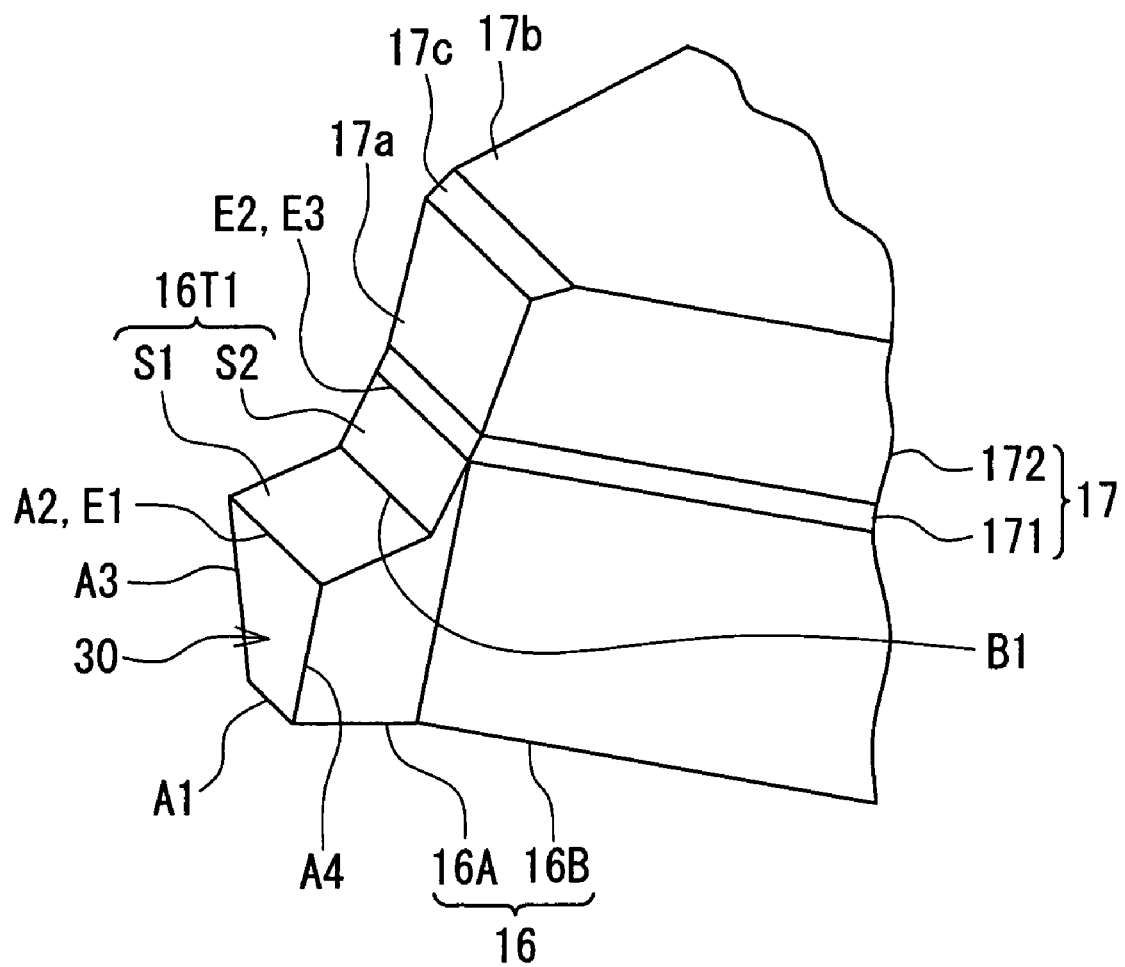
FIG. 1 is a perspective view illustrating respective portions of a pole layer and a nonmagnetic layer of a magnetic head of a first embodiment of the invention near the medium facing surface.
Figure 2:
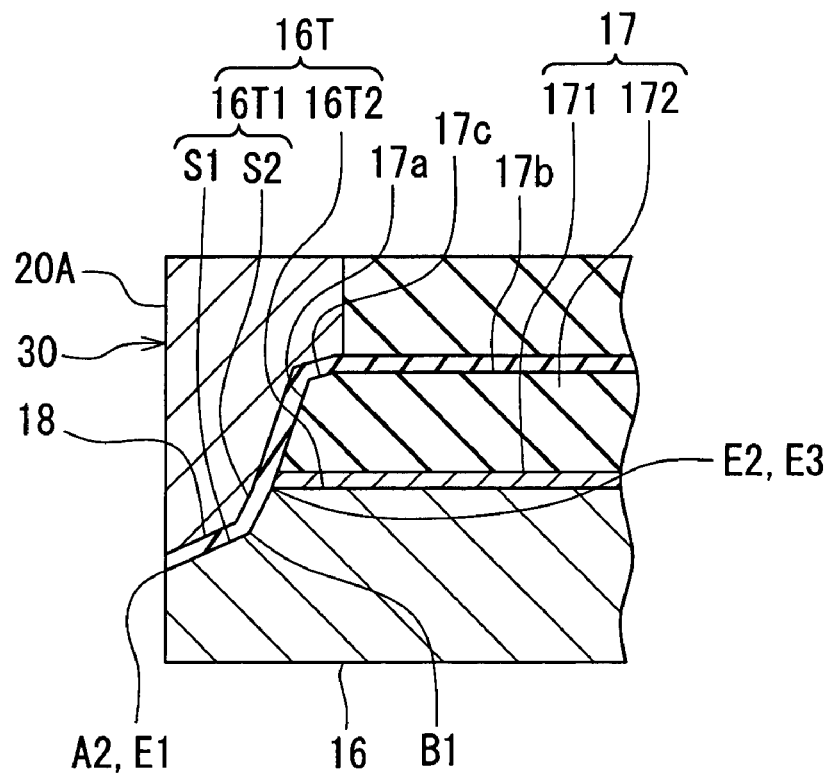
FIG. 2 is a cross-sectional view illustrating respective portions of the pole layer, the nonmagnetic layer, a gap layer and a shield of the magnetic head of the first embodiment of the invention near the medium facing surface.
Figure 3:
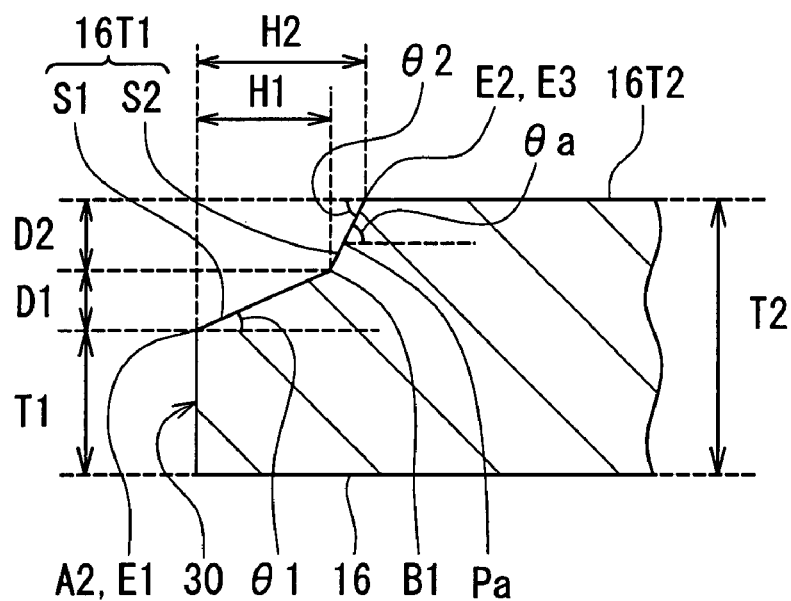
FIG. 3 is a cross-sectional view of a portion of the pole layer of the magnetic head of the first embodiment of the invention near the medium facing surface.

Reference is now made to FIG. 1 to FIG. 3 to describe the shapes of the pole layer 16, the nonmagnetic layer 17, the gap layer 18 and the first layer 20A of the shield 20 in detail. FIG. 1 is a perspective view illustrating respective portions of the pole layer 16 and the nonmagnetic layer 17 near the medium facing surface 30. FIG. 2 is a cross-sectional view illustrating respective portions the pole layer 16, the nonmagnetic layer 17, the gap layer 18 and the shield 20 near the medium facing surface 30. FIG. 3 is a cross-sectional view of a portion of the pole layer 16 near the medium facing surface 30.

As illustrated in FIG. 1, the end face of the pole layer 16 located in the medium facing surface 30 has: a first side A1 closest to the substrate 1; a second side A2 opposite to the first side A1; a third side A3 connecting an end of the first side A1 and an end of the second side A2 to each other; and a fourth side A4 connecting the other end of the first side A1 and the other end of the second side A2 to each other. The second side A2 defines the track width. The end face of the pole layer 16 located in the medium facing surface 30 has a width that decreases with decreasing distance from the first side A1. Each of the third side A3 and the fourth side A4 forms an angle within a range of 5 to 15 degrees, for example, with respect to the direction perpendicular to the top surface of the substrate 1. The length of the second side A2, that is, the track width, is within a range of 0.05 to 0.20 µm, for example.

Furthermore, as illustrated in FIG. 1 to FIG. 3, the pole layer 16 has a top surface 16T including: a first portion 16T1 having a first edge E1 located in the medium facing surface 30 and a second edge E2 opposite thereto; and a second portion 16T2 located farther from the medium facing surface 30 than the first portion 16T1 and connected to the first portion 16T1 at the second edge E2. The first edge E1 coincides with the second side A2.

As illustrated in FIG. 3, the distance from the substrate 1 to an arbitrary point Pa on the first portion 16T1 increases with increasing distance from the medium facing surface 30 to the point Pa. The first portion 16T1 has an angle of inclination θa taken at an arbitrary point Pa on the first portion 16T1 with respect to a direction perpendicular to the medium facing surface 30, and the angle of inclination θa increases with increasing distance from the medium facing surface 30 to the point Pa. In the embodiment, in particular, the angle of inclination θa of the first portion 16T1 taken at an arbitrary point Pa with respect to the direction perpendicular to the medium facing surface 30 increases stepwise with increasing distance from the medium facing surface 30 to the point Pa. At the first edge E1, the first portion 16T1 has an angle of inclination greater than zero degree with respect to the direction perpendicular to the medium facing surface 30. It should be noted that the angle of inclination θa of the first portion 16T1 taken at a point Pa with respect to the direction perpendicular to the medium facing surface 30 is an angle formed by the tangent plane of the first portion 16T1 at the point Pa with respect to the direction perpendicular to the medium facing surface 30.

In the embodiment, in particular, the first portion 16T1 includes: a first flat surface portion S1 including the first edge E1 and having a specific first angle of inclination θ1; and a second flat surface portion S2 including the second edge E2 and having a specific second angle of inclination θ2 greater than the first angle of inclination θ1. The first angle of inclination θ1 is also the angle of inclination of the first portion 16T1 taken at the first edge E1 with respect to the direction perpendicular to the medium facing surface 30. The second angle of inclination θ2 is also an angle of inclination of the first portion 16T1 taken at the second edge E2 with respect to the direction perpendicular to the medium facing surface 30. The first flat surface portion S1 and the second flat surface portion S2 are connected to each other at a boundary B1. Alternatively, such a configuration is also possible that the first flat surface portion S1 and the second flat surface portion S2 are not connected to each other but one or more flat surface portions having an angle of inclination greater than θ1 and smaller than θ2 are provided between the first flat surface portion S1 and the second flat surface portion S2.

The first angle of inclination θ1 is preferably within a range of 15 to 40 degrees. The second angle of inclination θ2 is preferably within a range of 40 to 75 degrees. The second portion 16T2 extends in a direction substantially perpendicular to the medium facing surface 30. The bottom surface of the pole layer 16 is flat and extends in a direction substantially perpendicular to the medium facing surface 30.

The nonmagnetic layer 17 is disposed on the second portion 16T2. The nonmagnetic layer 17 has a bottom surface touching the second portion 16T2, and this bottom surface has an edge E3 located at the second edge E2. In the example illustrated in FIG. 1 and FIG. 2, the nonmagnetic layer 17 includes the first layer 171 made of a metal material and disposed on part of the top surface of the pole layer 16, and the second layer 172 made of an inorganic insulating material and disposed on the first layer 171. The nonmagnetic layer 17 may consist of a single layer made of a metal material, or a single layer made of an inorganic insulating material.

The nonmagnetic layer 17 has a front end face 17a that faces toward the medium facing surface 30, a top surface 17b that is farther from the substrate 1, and a coupling surface 17c that couples the front end face 17a and the top surface 17b to each other. The front end face 17a, the top surface 17b and the coupling surface 17c are flat surfaces. In the embodiment, the distance from the medium facing surface 30 to an arbitrary point on the front end face 17a increases with increasing distance from the substrate 1 to the arbitrary point. The front end face 17a preferably has an angle of inclination within a range of 40 to 75 degrees with respect to the direction perpendicular to the medium facing surface 30. It is not necessarily required that the nonmagnetic layer 17 include the coupling surface 17c. In the case where the nonmagnetic layer 17 does not include the coupling surface 17c, a ridgeline is formed between the front end face 17a and the top surface 17b.

The gap layer 18 is disposed to cover the first portion 16T1 of the top surface 16T of the pole layer 16, and the front end face 17a, the coupling surface 17c and the top surface 17b of the nonmagnetic layer 17.

The first layer 20A of the shield 20 has a bottom surface touching the gap layer 18. The bottom surface of the first layer 20A corresponds to the bottom surface of the shield of the present invention. The bottom surface of the first layer 20A bends to be opposed to the pole layer 16 and the nonmagnetic layer 17 with the gap layer 18 in between. The distance between the bottom surface of the first layer 20A and the second portion 16T2 is greater than the distance between the bottom surface of the first layer 20A and the first portion 16T1.

Here, as illustrated in FIG. 3, the thickness of the pole layer 16 taken in the medium facing surface 30 is represented by T1, and the distance between the second portion 16T2 and the bottom surface of the pole layer 16 is represented by T2. In the first flat surface portion S1, the difference in height between the first edge E1 and the boundary B1, that is, the difference between the first edge E1 and the boundary B1 in distance from the top surface of the substrate 1, is represented by D1. In the second flat surface portion S2, the difference in height between the boundary B1 and the second edge E2, that is, the difference between the boundary B1 and the second edge E2 in distance from the top surface of the substrate 1, is represented by D2. For example, T2 is within a range of 0.32 to 0.55 µm, while T1 is equal to or greater than 0.2 µm and smaller than 0.4 µm. In addition, for example, D1 is greater than zero and equal to or smaller than 0.15 µm, while D2 is within a range of 0.06 to 0.15 µm. It is preferred that D1 be within a range of 0.05 to 0.15 µm.

For example, the thickness of the first layer 171 of the nonmagnetic layer 17 is within a range of 0.01 to 0.1 µm, the thickness of the second layer 172 of the nonmagnetic layer 17 is within a range of 0.1 to 0.5 µm, and the total thickness of the nonmagnetic layer 17 is within a range of 0.11 to 0.6 µm.

For example, the distance H1 between the boundary B1 and the medium facing surface 30 is within a range of 0.05 to 0.1 µm, while the distance H2 between the second edge E2 and the medium facing surface 30 is within a range of 0.08 to 0.12 µm.

In a portion of the first layer 20A of the shield 20 located above the pole layer 16, the shortest distance between the end face located in the medium facing surface 30 and the opposite end face is within a range of 0.18 to 0.26 µm, for example.

In the embodiment, throat height TH is equal to the distance between the edge E3 of the bottom surface of the nonmagnetic layer 17 and the medium facing surface 30, that is, equal to the distance H2 between the second edge E2 and the medium facing surface 30. The throat height TH is therefore within the range of 0.08 to 0.12 µm.

Figure 6:
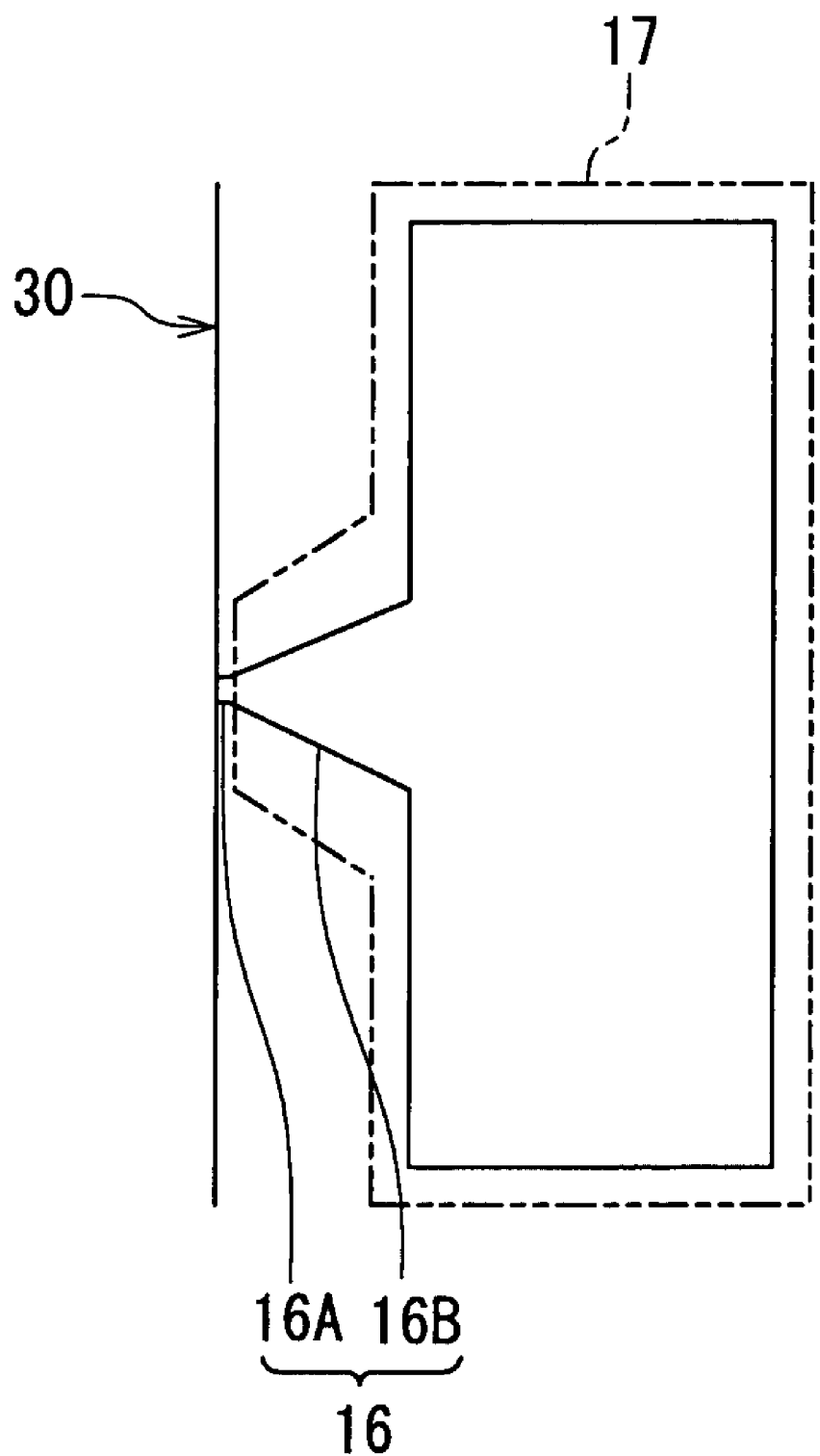
FIG. 6 is a top view of the pole layer of the magnetic head of the first embodiment of the invention.

FIG. 6 is a top view of the pole layer 16. As illustrated in FIG. 6, the pole layer 16 includes: a track width defining portion 16A having an end face located in the medium facing surface 30; and a wide portion 16B that is located farther from the medium facing surface 30 than the track width defining portion 16A and that is greater in width than the track width defining portion 16A. The track width defining portion 16A has a width that does not change in accordance with the distance from the medium facing surface 30. For example, the wide portion 16B is equal in width to the track width defining portion 16A at the boundary with the track width defining portion 16A, and gradually increases in width as the distance from the medium facing surface 30 increases and then maintains a specific width to the end of the wide portion 16B. In the embodiment, the track width defining portion 16A is a portion of the pole layer 16 from the end face located in the medium facing surface 30 to the point at which the width of the pole layer 16 starts to increase. Here, the length of the track width defining portion 16A taken in the direction perpendicular to the medium facing surface 30 is called a neck height NH. The neck height NH is within a range of 0.1 to 0.3 µm, for example.

FIG. 1 illustrates an example in which the distance from the medium facing surface 30 to the second edge E2 of the first portion 16T1 of the top surface 16T of the pole layer 16 is equal to the distance from the medium facing surface 30 to the boundary between the track width defining portion 16A and the wide portion 16B, i.e., the neck height NH. However, the distance from the medium facing surface 30 to the edge E2 may be smaller or greater than the distance from the medium facing surface 30 to the boundary between the track width defining portion 16A and the wide portion 16B, i.e., the neck height NH. In addition, the throat height TH may be equal to the neck height NH, or may be smaller or greater than the neck height NH.

Reference is now made to FIG. 7A to FIG. 16A and FIG. 7B to FIG. 16B to describe a method of manufacturing the magnetic head of the embodiment. FIG. 7A to FIG. 16A each illustrate a cross section of a stack of layers obtained in the course of manufacturing the magnetic head, the cross section being perpendicular to the medium facing surface and the top surface of the substrate. FIG. 7B to FIG. 16B each illustrate a cross section of part of the stack of layers near the medium facing surface, the cross section being parallel to the medium facing surface. In FIG. 7A to FIG. 16A, "ABS" indicates an imaginary plane located at a target position of the medium facing surface 30. The portions closer to the substrate 1 than the encasing layer 12 are omitted in FIG. 7A to FIG. 16A and FIG. 7B to FIG. 16B.

In the method of manufacturing the magnetic head of the embodiment, first, as illustrated in FIG. 5, the insulating layer 2, the bottom shield layer 3 and the bottom shield gap film 4 are formed in this order on the substrate 1. Next, the MR element 5 and leads (not shown) connected to the MR element 5 are formed on the bottom shield gap film 4. Next, the MR element 5 and the leads are covered with the top shield gap film 6. Next, the top shield layer 7, the nonmagnetic layer 81, the second top shield layer 82 and the insulating layer 83 are formed in this order on the top shield gap film 6. Next, the coil 9 and the insulating layers 10 and 11 are formed on the insulating layer 83. Next, the top surfaces of the coil 9 and the insulating layers 10 and 11 are flattened by CMP, for example.

Figures 7A, 7B:
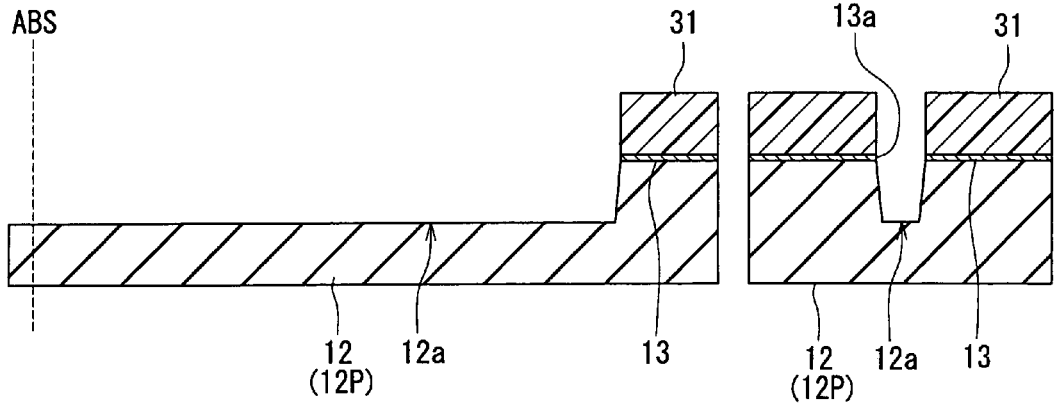
FIG. 7A and FIG. 7B are views for illustrating a step of a method of manufacturing the magnetic head of the first embodiment of the invention.

FIG. 7A and FIG. 7B illustrate the next step. In this step, first, a nonmagnetic layer 12P that is to become the encasing layer 12 later by undergoing formation of the groove 12a therein is formed on the flattened top surfaces of the coil 9 and the insulating layers 10 and 11. Next, the nonmagnetic metal layer 13 made of a nonmagnetic metal material is formed by sputtering, for example, on the nonmagnetic layer 12P. The nonmagnetic metal layer 13 has a thickness within a range of 20 to 100 nm, for example.

Next, a photoresist layer having a thickness of 1.0 µm, for example, is formed on the nonmagnetic metal layer 13. Next, this photoresist layer is patterned to form a mask 31 to be used for forming the groove 12a of the encasing layer 12. The mask 31 has an opening having a shape corresponding to the groove 12a.

Next, the nonmagnetic metal layer 13 is selectively etched using the mask 31. As a result, the penetrating opening 13a is formed in the nonmagnetic metal layer 13. The opening 13a has a shape corresponding to the plane geometry of the pole layer 16 to be formed later. Furthermore, a portion of the nonmagnetic layer 12P exposed from the opening 13a of the nonmagnetic metal layer 13 is selectively etched to form the groove 12a in the nonmagnetic layer 12P. Next, the mask 31 is removed. As a result of the formation of the groove 12a, the nonmagnetic layer 12P becomes the encasing layer 12. The edge of the opening 13a of the nonmagnetic metal layer 13 is located directly above the edge of the groove 12a in the top surface of the encasing layer 12.

The etching of each of the nonmagnetic metal layer 13 and the nonmagnetic layer 12P is performed by reactive ion etching (hereinafter referred to as RIE) or ion beam etching (hereinafter referred to as IBE), for example. The etching for forming the groove 12a in the nonmagnetic layer 12P is performed such that the walls of the groove 12a corresponding to both side portions of the track width defining portion 16A of the pole layer 16 each form an angle within a range of 5 to 15 degrees, for example, with respect to the direction perpendicular to the top surface of the substrate 1.

Figures 8A, 8B:
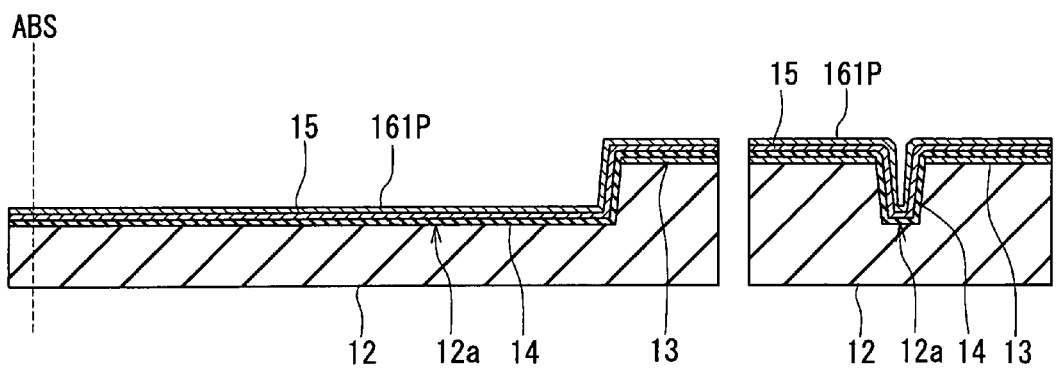
FIG. 8A and FIG. 8B are views for illustrating a step that follows the step of FIG. 7A and FIG. 7B.

FIG. 8A and FIG. 8B illustrate the next step. In this step, first, the nonmagnetic film 14 is formed on the entire top surface of the stack of layers. The nonmagnetic film 14 is also formed in the groove 12a of the encasing layer 12. The nonmagnetic film 14 is formed by sputtering or chemical vapor deposition (hereinafter referred to as CVD), for example. The thickness of the nonmagnetic film 14 is precisely controllable. In the case of forming the nonmagnetic film 14 by CVD, it is preferred to employ, in particular, so-called atomic layer CVD (hereinafter referred to as ALCVD) in which formation of a single atomic layer is repeated. In this case, it is possible to control the thickness of the nonmagnetic film 14 with higher precision. In the case of forming the nonmagnetic film 14 by ALCVD, it is preferable to use alumina, in particular, as the material of the nonmagnetic film 14. In the case of using a semiconductor material to form the nonmagnetic film 14, it is preferred that the nonmagnetic film 14 be formed by ALCVD at low temperatures (around 200° C.) or by low-pressure CVD at low temperatures. The semiconductor material to be used as the material of the nonmagnetic film 14 is preferably undoped polycrystalline silicon or amorphous silicon.

Next, the polishing stopper layer 15 is formed on the entire top surface of the stack of layers by sputtering or ALCVD, for example. The polishing stopper layer 15 is also formed in the groove 12a of the encasing layer 12. The polishing stopper layer 15 indicates the level at which polishing in the polishing step to be performed later is stopped.

Next, a first magnetic layer 161P that is to become the first layer 161 of the pole layer 16 later is formed on the entire top surface of the stack of layers. The first magnetic layer 161P is formed by sputtering or ion beam deposition, for example. In the case of forming the first magnetic layer 161P by sputtering, it is preferred to employ collimation sputtering or long throw sputtering. It should be noted that, since the first layer 161 can be dispensed with as previously mentioned, it is not necessarily required to form the first magnetic layer 161P.

Figures 9A, 9B:
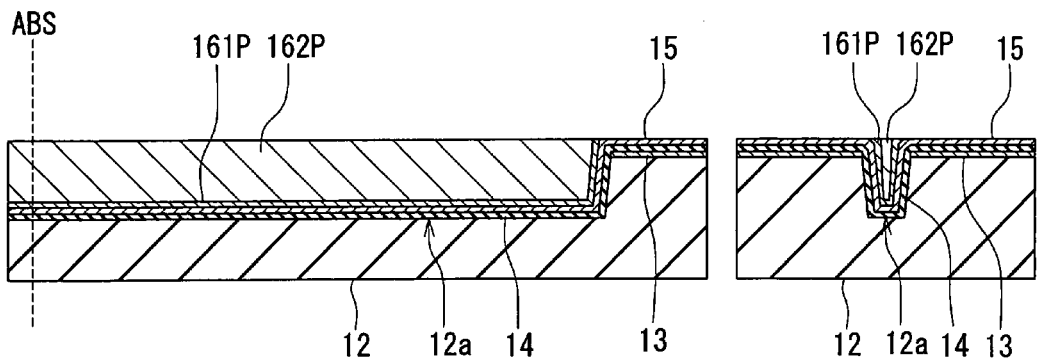
FIG. 9A and FIG. 9B are views for illustrating a step that follows the step of FIG. 8A and FIG. 8B.

FIG. 9A and FIG. 9B illustrate the next step. In this step, first, a second magnetic layer 162P that is to become the second layer 162 of the pole layer 16 later is formed on the first magnetic layer 161P. The second magnetic layer 162P is formed such that the top surface thereof is located higher than the top surfaces of the nonmagnetic metal layer 13, the nonmagnetic film 14 and the polishing stopper layer 15. The second magnetic layer 162P is formed by frame plating, for example. In this case, the first magnetic layer 161P is used as an electrode for plating. In the case where the polishing stopper layer 15 is made of a conductive material, the layer 15 is also used as an electrode for plating. The second magnetic layer 162P may be formed by making an unpatterned plating layer and then patterning this plating layer through etching. The magnetic layers 161P and 162P correspond to the magnetic layer of the present invention.

Next, a coating layer (not shown) made of alumina, for example, is formed to a thickness of 0.5 to 1.2 μm, for example, on the entire top surface of the stack of layers. Next, the coating layer, the second magnetic layer 162P and the first magnetic layer 161P are polished by CMP, for example, until the polishing stopper layer 15 is exposed, and the top surfaces of the polishing stopper layer 15, the first magnetic layer 161P and the second magnetic layer 162P are thereby flattened. In the case of polishing the coating layer, the second magnetic layer 162P and the first magnetic layer 161P by CMP, such a slurry is used that polishing is stopped when the polishing stopper layer 15 is exposed, such as an alumina-base slurry.

Figures 10A, 10B:
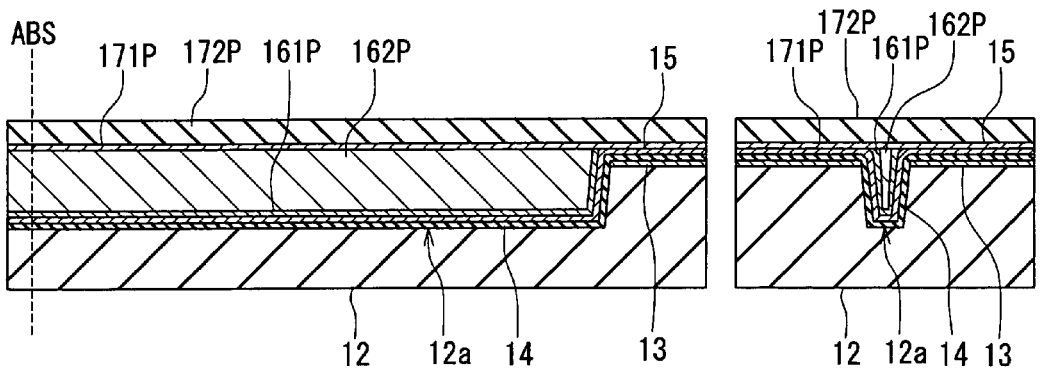
FIG. 10A and FIG. 10B are views for illustrating a step that follows the step of FIG. 9A and FIG. 9B.

FIG. 10A and FIG. 10B illustrate the next step. In this step, first, a first film 171P is formed by sputtering, for example, on the entire top surface of the stack of layers including the top surfaces of the first magnetic layer 161P and the second magnetic layer 162P. The first film 171P is to become the first layer 171 of the nonmagnetic layer 17 later by undergoing partial etching. Next, a second film 172P is formed on the first film 171P by sputtering, for example. The second film 172P is to become the second layer 172 of the nonmagnetic layer 17 later by undergoing partial etching.

Figures 11A, 11B:
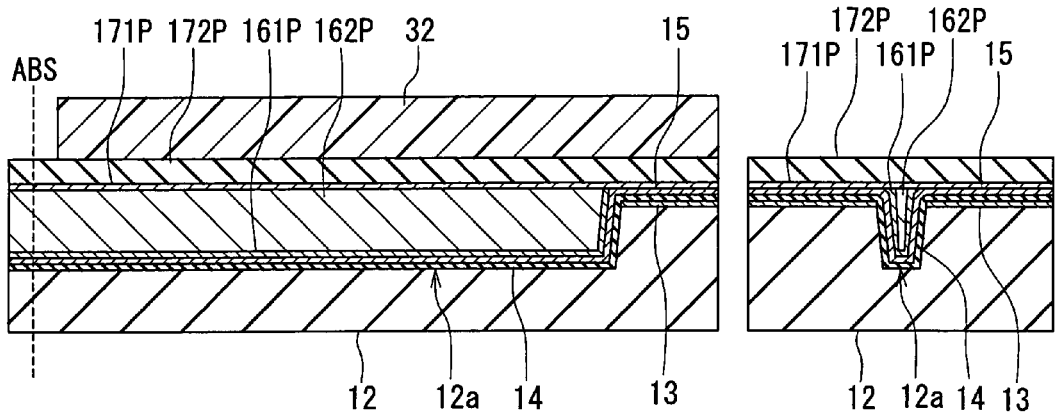
FIG. 11A and FIG. 11B are views for illustrating a step that follows the step of FIG. 10A and FIG. 10B.

FIG. 11A and FIG. 11B illustrate the next step. In this step, first, a photoresist layer having a thickness of 1.0 μm, for example, is formed on the second film 172P. Next, this photoresist layer is patterned to form a mask 32 to be used for patterning the second film 172P.

Figures 12A, 12B:
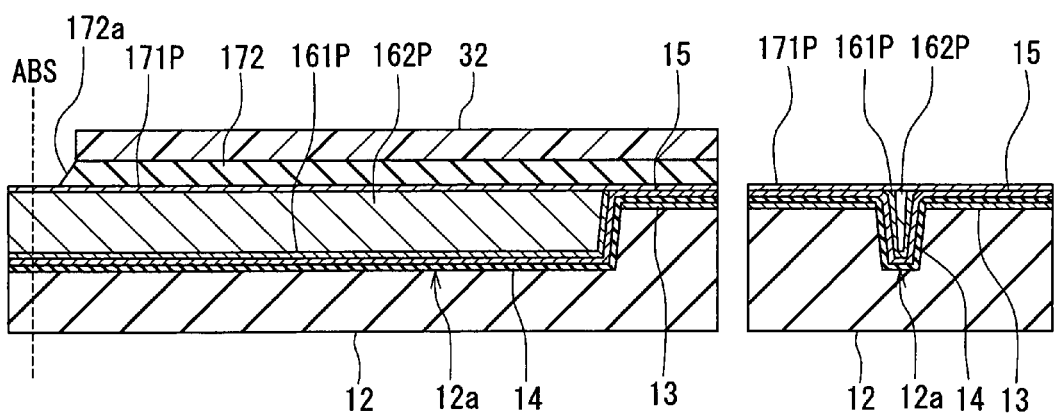
FIG. 12A and FIG. 12B are views for illustrating a step that follows the step of FIG. 11A and FIG. 11B.

FIG. 12A and FIG. 12B illustrate the next step. In this step, first, the second film 172P is partially etched by RIE, for example, using the mask 32. In the embodiment, the etching of the second film 172P is performed such that the bottom of the groove formed by the etching reaches the top surface of the first film 171P and the etching is stopped at that level. Therefore, the material of the first film 171P to be selected is such one that the etching rate thereof when the second film 172P is partially etched is lower than that of the second film 172P. Specifically, for example, Ru, NiCr or NiCu is used as the material of the first film 171P, while $Al_2O_3$ or a silicon oxide is used as the material of the second film 172P.

As described above, the second film 172P becomes second layer 172 as a result of undergoing the partial etching. In the step of partially etching the second film 172P, a front end face 172a is formed near an end of the second layer 172 closest to the plane ABS. The distance from the medium facing surface 30 to an arbitrary point on the front end face 172a increases with increasing distance from the substrate 1 to the arbitrary point. The front end face 172a preferably has an angle of inclination within a range of 40 to 75 degrees with respect to the direction perpendicular to the medium facing surface 30. A specific example of the method of etching the second film 172P will be described in detail later. Next, the mask 32 is removed.

FIG. 13A and FIG. 13B illustrate the next step. In this step, first, the first film 171P is partially etched by IBE, for example, using the second layer 172 as a mask. As a result, the first film 171P becomes the first layer 171, whereby the nonmagnetic layer 17 having the first layer 171 and the second layer 172 is formed.

Next, the magnetic layers 161P and 162P are partially etched by IBE, for example, using the nonmagnetic layer 17 as a mask. Hereinafter, the magnetic layers 161P and 162P having undergone this etching are referred to as magnetic layers 161Q and 162Q, respectively. A combination of the magnetic layers 161Q and 162Q is referred to as a magnetic layer 160. The etching of the first film 171P and the etching of the magnetic layers 161P and 162P are performed in succession. A specific example of the method of etching the first film 171P and the magnetic layers 161P and 162P will be described in detail later.

FIG. 14A and FIG. 14B illustrate the next step. In this step, first, the gap layer 18 is formed on the entire top surface of the stack of layers. The gap layer 18 is formed by sputtering or CVD, for example. In the case of forming the gap layer 18 by CVD, it is preferred to employ ALCVD, in particular. In the case of forming the gap layer 18 by ALCVD, it is preferred to use alumina, in particular, as the material of the gap layer 18. If formed by ALCVD, the gap layer 18 exhibits a good step coverage. Employing ALCVD to form the gap layer 18 thus allows the resultant gap layer 18 to be uniform on an uneven surface.

FIG. 15A and FIG. 15B illustrate the next step. In this step, the nonmagnetic layer 17 and the gap layer 18, except for portions thereof located close to the medium facing surface 30, are selectively etched by IBE, for example. Next, the first layer 20A is formed on the gap layer 18 and the yoke layer 20B is formed on a region of the magnetic layer 160 away from the plane ABS. The first layer 20A and the yoke layer 20B may be formed by frame plating, or by making a magnetic layer through sputtering and then selectively etching this magnetic layer. Next, the nonmagnetic layer 21 is formed on the entire top surface of the stack of layers. Next, the nonmagnetic layer 21 is polished by CMP, for example, so that the first layer 20A and the yoke layer 20B are exposed, and the top surfaces of the first layer 20A, the yoke layer 20B and the nonmagnetic layer 21 are thereby flattened.

FIG. 16A and FIG. 16B illustrate the next step. In this step, first, the insulating layer 22 is formed on regions of the top surfaces of the yoke layer 20B and the nonmagnetic layer 21 where the coil 23 is to be disposed. Next, the coil 23 is formed by frame plating, for example, such that at least part of the coil 23 is disposed on the insulating layer 22. Next, the insulating layer 24 is formed to cover the coil 23. Next, the second layer 20C is formed by frame plating, for example, to complete the shield 20.

Next, as illustrated in FIG. 5, the protection layer 25 is formed to cover the entire top surface of the stack of layers. Wiring and terminals are then formed on the protection layer 25, the substrate 1 is cut at a position near the plane ABS, the surface formed by this cutting is polished to form the medium facing surface 30, and a process such as fabrication of flying rails is performed to thereby complete the magnetic head. When the medium facing surface 30 is formed, the magnetic layers 161Q and 162Q become the first layer 161 and the second layer 162, respectively, whereby the pole layer 16 is completed.

It should be noted that, in the embodiment, the position of the edge E2 of the first portion 16T1 of the top surface 16T of the pole layer 16 has an influence on the write characteristics of the magnetic head. It is therefore important to control the position of the edge E2 with precision. The position of the edge E2 is determined by the position of the edge E3 of the bottom surface of the nonmagnetic layer 17. Therefore, in the embodiment, it is important to control the position of the edge E3 with precision.

Figure 17:
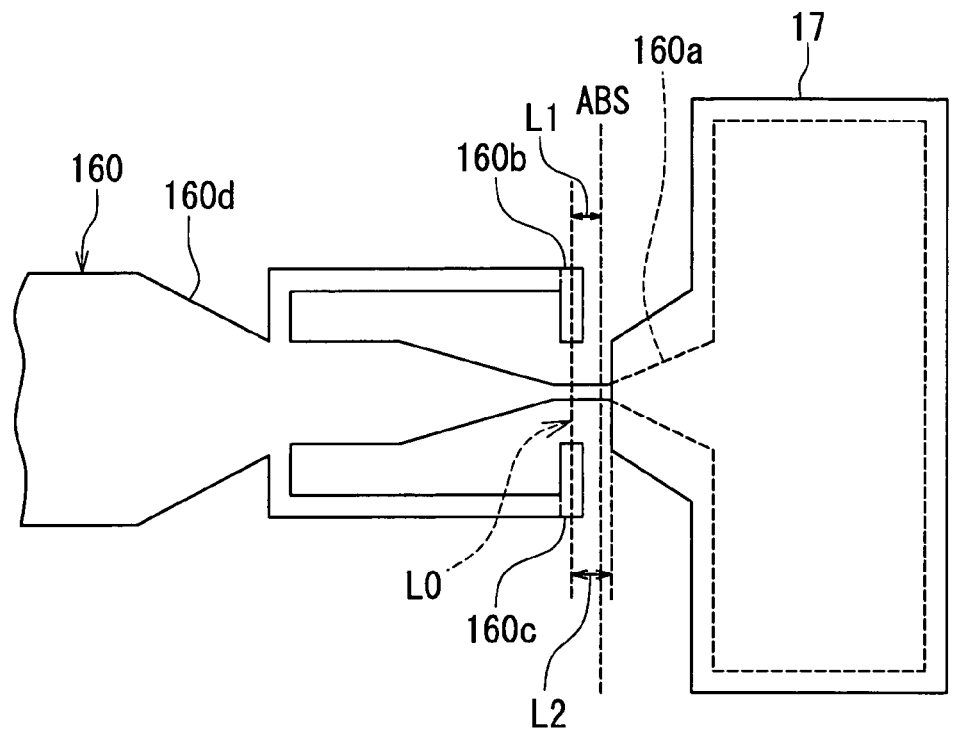
FIG. 17 is a top view illustrating an indicator of the first embodiment of the invention.

Reference is now made to FIG. 17 to describe an example of the method of determining the position of the edge E3 of the bottom surface of the nonmagnetic layer 17. FIG. 17 is a top view of the nonmagnetic layer 17 and the magnetic layer 160 that is to become the pole layer 16 later. The magnetic layer 160 includes a pole-layer-corresponding portion 160a, indicator portions 160b and 160c, and a coupling portion 160d. The pole-layer-corresponding portion 160a is a portion to become the pole layer 16 later. In FIG. 17, the pole-layer-corresponding portion 160a is a portion of the magnetic layer 160 located on a right side of the plane ABS. The indicator portions 160b and 160c serve as references for indicating the position of the plane ABS and the position of the edge E3 of the bottom surface of the nonmagnetic layer 17. The top surface of each of the indicator portions 160b and 160c is rectangular. The indicator portions 160b and 160c correspond to the indicator of the present invention. The coupling portion 160d is a portion of the magnetic layer 160 that couples the pole-layer-corresponding portion 160a and the indicator portions 160b, 160c to each other.

The top surface of the indicator portion 160b has a side closer to the plane ABS and a side opposite thereto. Similarly, the top surface of the indicator portion 160c has a side closer to the plane ABS and a side opposite thereto. As illustrated in FIG. 17, an imaginary straight line L0 passing through the midpoint between the above-mentioned two sides of the top surface of the indicator portion 160b and the midpoint between the above-mentioned two sides of the top surface of the indicator portion 160c is parallel to the plane ABS. In the embodiment, the position of the straight line L0 is used as a reference for indicating the position of the plane ABS and the position of the edge E3 of the bottom surface of the nonmagnetic layer 17. Specifically, in the embodiment, the distance between the straight line L0 and the plane ABS is defined as a predetermined value L1 while the distance between the straight line L0 and the edge E3 is defined as a predetermined value L2.

In the manufacturing process of the magnetic head, after the magnetic layer 160 is formed, by recognizing the position of the straight line L0 through observation of the indicator portions 160b and 160c with an electron microscope, it is possible to recognize the position of the plane ABS and to recognize the position at which the edge E3 is to be located before the nonmagnetic layer 17 is formed. As the electron microscope, it is preferred to employ a critical dimension measurement scanning electron microscope.

In the embodiment, the position at which the edge E3 is to be located is recognized in the foregoing manner before the nonmagnetic layer 17 is formed, and then the nonmagnetic layer 17 is formed such that the edge E3 is located at this position. By determining the position of the edge E2 of the first portion 16T1 of the top surface 16T of the pole layer 16 through the use of the indicator (the indicator portions 160b and 160c) as the reference as described above, it is possible to determine the position of the edge E2 with precision, and as a result, it is possible to control the write characteristics of the magnetic head with precision.

Figure 18:
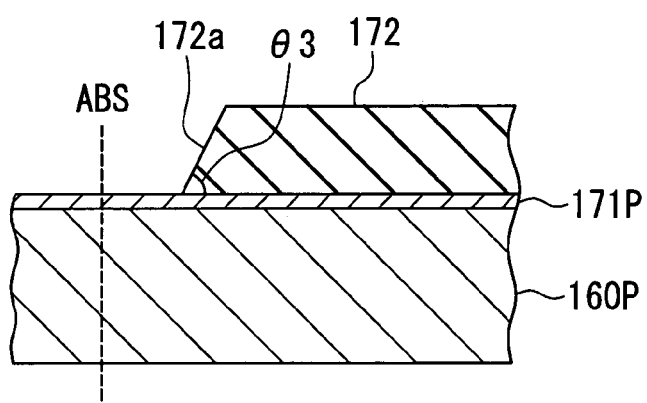
FIG. 18 is a cross-sectional view for illustrating a step of the method of manufacturing the magnetic head of the first embodiment of the invention.

Now, with reference to FIG. 18, a detailed description will be given of a specific example of the method of etching the second film 172P employed in the step illustrated in FIG. 12A and FIG. 12B. In FIG. 18, the reference numeral 160P indicates a magnetic layer made up of a combination of the magnetic layers 161P and 162P. In this example, the material of the first film 171P is Ru while the material of the second film 172P is $Al_2O_3$. The second film 172P is etched by RIE using an etching gas containing $BCl_3$ and $Cl_2$. In order to form the front end face 172a inclined with respect to the direction perpendicular to the medium facing surface 30, the etching gas further contains $CF_4$, $N_2$ or Ar. The proportion of $BCl_3$ and $Cl_2$ in the etching gas is 4:1 to 6:1. By way of example, the etching gas contains 80-sccm $BCl_3$, 15-sccm $Cl_2$ and 18-sccm $CF_4$. In this example, RIE is performed using high-density plasma, with high-frequency bias power of 40 W and a pressure of 0.2 to 0.5 Pa, to etch the second film 172P. By etching the second film 172P under the foregoing conditions, the front end face 172a is formed near an end of the second layer 172 closest to the plane ABS. The front end face 172a has an angle of inclination $\theta3$ within a range of 40 to 75 degrees, for example, with respect to the direction perpendicular to the medium facing surface 30. The etching of the second film 172P by RIE as described above is performed at least until the first film 171P is exposed. The first film 171P made of Ru is hardly etched by RIE performed under the foregoing conditions.

Figure 19:
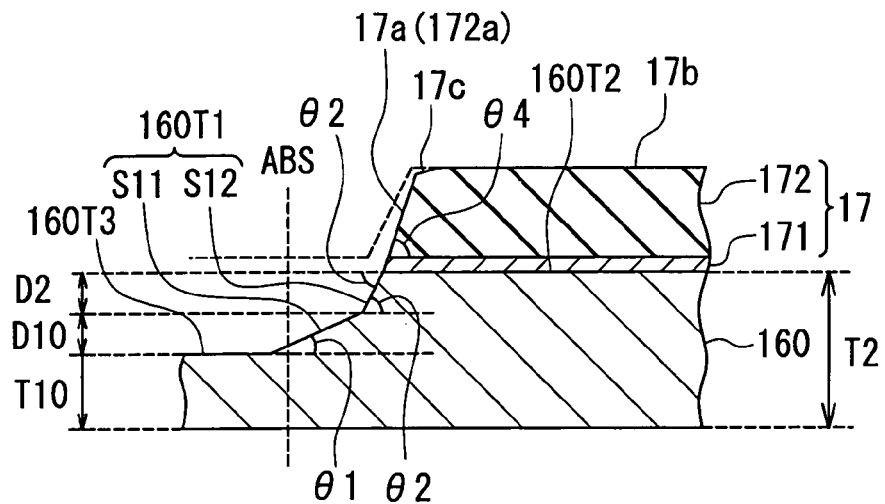
FIG. 19 is a cross-sectional view for illustrating a step that follows the step of FIG. 18.
Figure 20:
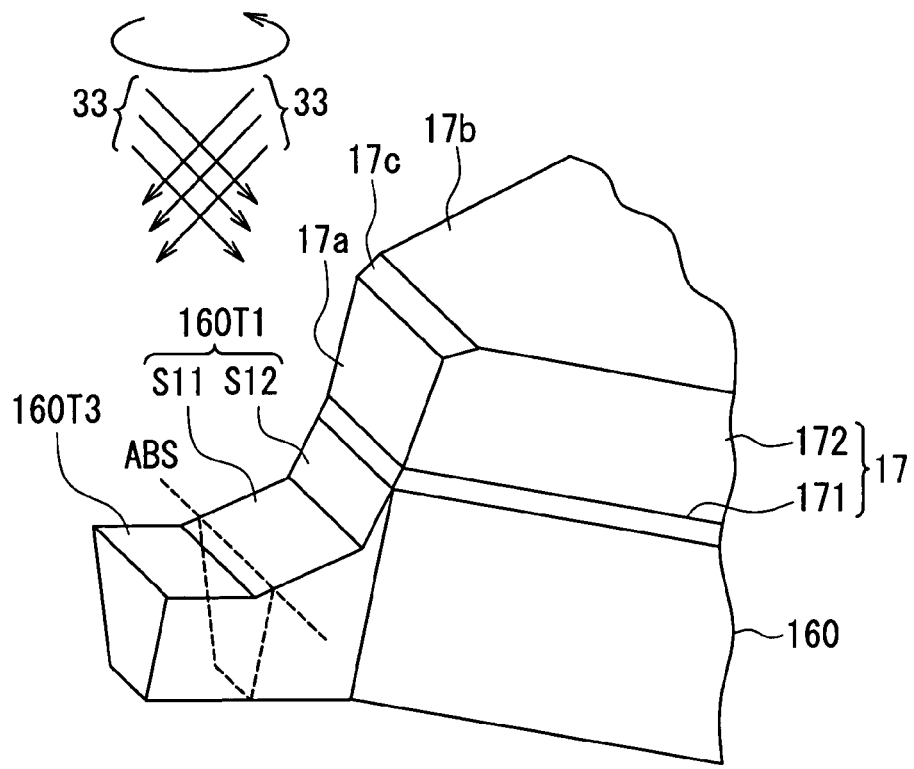
FIG. 20 is a perspective view for illustrating the step of FIG. 19.

Next, with reference to FIG. 19 and FIG. 20, a detailed description will be given of a specific example of the method of etching the first film 171P and the magnetic layer 160P (161P and 162P) employed in the step illustrated in FIG. 13A and FIG. 13B. FIG. 19 is a cross-sectional view illustrating the step of etching the first film 171P and the magnetic layer 160P. FIG. 20 is a perspective view illustrating the step of FIG. 19. In this example, first, the first film 171P is partially etched by IBE using the second layer 172 as a mask. As a result, the first film 171P becomes the first layer 171, whereby the nonmagnetic layer 17 having the first layer 171 and the second layer 172 is formed.

Next, the magnetic layer 160P is partially etched by IBE using the nonmagnetic layer 17 as a mask. The magnetic layer 160P thereby becomes the magnetic layer 160. In FIG. 20 the arrows marked with numeral 33 each indicate an ion beam of IBE. The partial etching of the magnetic layer 160P is performed such that the direction of travel of the ion beam 33 forms an angle within a range of 45 to 55 degrees with respect to the direction perpendicular to the top surface of the substrate 1, and that the direction of travel of the ion beam rotates when seen in the direction perpendicular to the top surface of the substrate 1. By performing IBE in such a manner, a first portion 160T1, a second portion 160T2 and a third portion 160T3 are formed in the top surface of the magnetic layer 160P. The second portion 160T2 is a portion covered with the nonmagnetic layer 17, and extends in a direction substantially perpendicular to the plane ABS. The first portion 160T1 and the third portion 160T3 are portions that are not covered with the nonmagnetic layer 17. The third portion 160T3 is located closer to the substrate 1 than is the second portion 160T2, and extends in a direction substantially perpendicular to the plane ABS. The first portion 160T1 couples the second portion 160T2 and the third portion 160T3 to each other. The first portion 160T1 includes: a first flat surface portion S11 connected to the third portion 160T3 and having a specific first angle of inclination $\theta1$; and a second flat surface portion S12 connected to the second portion 160T2 and having a specific second angle of inclination $\theta2$ greater than the first angle of inclination $\theta1$. When the medium facing surface 30 is formed later, the first and second flat surface portions S11 and S12 respectively become the first and second flat surface portions S1 and S2 of the first portion 16T1 of the top surface 16T of the pole layer 16. In addition, when the medium facing surface 30 is formed later, the first portion 160T1 becomes the first portion 16T1 of the top surface 16T of the pole layer 16 while the second portion 160T2 becomes the second portion 16T2 of the top surface 16T.

As illustrated in FIG. 19, in the step of partially etching the magnetic layer 160P by IBE using the nonmagnetic layer 17 as the mask, in the second layer 172 the front end face 172a is slightly etched and the corner between the front end face 172a and the top surface is etched to form the coupling surface 17c. The front end face 172a having undergone the etching has an angle of inclination θ4 within a range of 40 to 75 degrees, for example, with respect to the direction perpendicular to the medium facing surface 30. The angle θ4 may be greater than the angle of inclination θ3 that the front end face 172a had before the step of partially etching the magnetic layer 160P.

In the step of partially etching the magnetic layer 160P, the second flat surface portion S12 and an end face of the first layer 171 closer to the medium facing surface 30 are formed to be contiguous to the front end face 172a. The angle of inclination θ2 of the second flat surface portion S12 is nearly equal to the angle of inclination θ4 of the front end face 172a. The angle of inclination θ2 is determined by the angle of inclination θ3 that the front end face 172a had before the step of partially etching the magnetic layer 160P and the angle formed by the direction of travel of the ion beam 33 with respect to the direction perpendicular to the top surface of the substrate 1.

Furthermore, in the step of partially etching the magnetic layer 160P, a portion of the top surface of the magnetic layer 160P away from the front end face 172a of the second layer 172 is etched almost evenly, so that the third portion 160T3 is formed. The first flat surface portion S11 having the angle of inclination θ1 is formed between the third portion 160T3 and the second flat surface portion S12 due to a shadow effect of the second layer 172. The angle of inclination θ1 is greater than zero degree and smaller than the angle of inclination θ2 of the second flat surface portion S12. For example, the angle of inclination θ1 is within a range of 15 to 40 degrees. The angle of inclination θ1 is determined by the thickness of the second layer 172 and the angle formed by the direction of travel of the ion beam 33 with respect to the direction perpendicular to the top surface of the substrate 1.

Here, as illustrated in FIG. 19, the distance between the third portion 160T3 and the bottom surface of the magnetic layer 160 is represented by T10. The difference in height between the boundary between the third portion 160T3 and the first flat surface portion S11 and the boundary between the first flat surface portion S11 and the second flat surface portion S12, that is, the difference between these boundaries in distance from the top surface of the substrate 1, is represented by D10. T10 is within a range of 0.2 to 0.25 μm, for example. D10 is within a range of 0.06 to 0.15 μm, for example. The difference in height between the boundary between the first flat surface portion S11 and the second flat surface portion S12 and the boundary between the second flat surface portion S12 and the second portion 160T2, that is, the difference between these boundaries in distance from the top surface of the substrate 1, is equal to D2 shown in FIG. 3, which is within a range of 0.06 to 0.15 μm, for example. The distance between the second portion 160T2 and the bottom surface of the magnetic layer 160 is equal to T2 shown in FIG. 3, which is within a range of 0.32 to 0.55 μm, for example.

The plane ABS intersects the first flat surface portion S11 of the first portion 160T1. By forming the medium facing surface 30 to coincide with the plane ABS, the first flat surface portion S11 becomes the first flat surface portion S1 of the first portion 16T1 of the top surface 16T of the pole layer 16, and the second flat surface portion S12 becomes the second flat surface portion S2 of the first portion 16T1 of the top surface 16T of the pole layer 16. In addition, the first portion 160T1 becomes the first portion 16T1 of the top surface 16T of the pole layer 16, and the second portion 160T2 becomes the second portion 16T2 of the top surface 16T.

The operation and effects of the magnetic head of the embodiment will now be described. In the magnetic head, the write head writes data on a recording medium while the read head reads data written on the recording medium. In the write head, the coil 23 generates a magnetic field that corresponds to data to be written on the recording medium. The pole layer 16 and the shield 20 form a magnetic path that allows a magnetic flux corresponding to the magnetic field generated by the coil 23 to pass therethrough. The pole layer 16 allows the magnetic flux corresponding to the magnetic field generated by the coil 23 to pass and generates a write magnetic field used for writing the data on the recording medium by means of the perpendicular magnetic recording system. The shield layer 20 takes in a disturbance magnetic field applied from outside the magnetic head to the magnetic head. It is thereby possible to prevent erroneous writing on the recording medium caused by the disturbance magnetic field intensively taken in into the pole layer 16.

According to the embodiment, in the medium facing surface 30, the end face of the shield 20 is located forward of the end face of the pole layer 16 along the direction T of travel of the recording medium (that is, located closer to the air outflow end of the slider) with a specific small distance provided therebetween by the gap layer 18. The position of an end of the bit pattern to be written on the recording medium is determined by the position of the end of the pole layer 16 that is closer to the gap layer 18 and located in the medium facing surface 30. The shield 20 takes in a magnetic flux generated from the end face of the pole layer 16 located in the medium facing surface 30 and expanding in directions except the direction perpendicular to the plane of the recording medium so as to prevent this flux from reaching the recording medium. It is thereby possible to prevent a direction of magnetization of the bit pattern already written on the recording medium from being changed due to the effect of the above-mentioned flux. As a result, according to the embodiment, it is possible to improve the linear recording density.

According to the embodiment, as illustrated in FIG. 1, the width of the end face of the pole layer 16 located in the medium facing surface 30 decreases with decreasing distance from the first side A1. This makes it possible to prevent the problems resulting from the skew.

In the embodiment, the top surface 16T of the pole layer 16 includes: the first portion 16T1 having the first edge E1 located in the medium facing surface 30 and the second edge E2 opposite thereto; and the second portion 16T2 located farther from the medium facing surface 30 than the first portion 16T1 and connected to the first portion 16T1 at the second edge E2. The first edge E1 coincides with the second side A2 of the end face of the pole layer 16 that defines the track width.

The distance from the substrate 1 to an arbitrary point Pa on the first portion 16T1 increases with increasing distance from the medium facing surface 30 to the point Pa. The angle of inclination θa of the first portion 16T1 taken at an arbitrary point Pa on the first portion 16T1 with respect to the direction perpendicular to the medium facing surface 30 increases with increasing distance from the medium facing surface 30 to the point Pa. The angle of inclination θ1 of the first portion 16T1 taken at the first edge E1 with respect to the direction perpendicular to the medium facing surface 30 is greater than zero degree. In the embodiment, in particular, the first portion 16T1 includes the first flat surface portion S1 including the first edge E1 and having the specific first angle of inclination θ1, and the second flat surface portion S2 including the second edge E2 and having the specific second angle of inclination θ2 greater than the first angle of inclination θ1. The second portion 16T2 extends in a direction substantially perpendicular to the medium facing surface 30. According to the embodiment, such a shape of the pole layer 16 makes it possible to prevent the problems resulting from the skew through the reduction in thickness of the pole layer 16 taken in the medium facing surface 30, and also makes it possible to introduce magnetic flux of great magnitude to the medium facing surface 30 through the pole layer 16. Consequently, it is possible to improve the write characteristics such as the overwrite property.

According to the embodiment, in the neighborhood of the medium facing surface 30, the cross-sectional area of the pole layer 16 perpendicular to the direction in which magnetic flux flows is greater as compared with a case where the thickness of the pole layer is uniform in a region from the medium facing surface 30 to a specific point when seen in the direction perpendicular to the medium facing surface 30. As a result, according to the embodiment, it is possible to allow magnetic flux of greater magnitude to pass through the pole layer 16 in the neighborhood of the medium facing surface 30. It is thereby possible to improve the write characteristics such as the overwrite property.

Furthermore, according to the embodiment, since the angle of inclination θa of the first portion 16T1 taken at an arbitrary point Pa on the first portion 16T1 with respect to the direction perpendicular to the medium facing surface 30 increases with increasing distance from the medium facing surface 30 to the point Pa, the cross-sectional area of the pole layer 16 perpendicular to the direction in which magnetic flux flows is greater in the neighborhood of the medium facing surface 30, compared with a case where the first portion 16T1 is a single flat surface having the angle of inclination θ1. As a result, according to the embodiment, it is possible to allow magnetic flux of greater magnitude to pass through the pole layer 16 in the neighborhood of the medium facing surface 30. It is thereby possible to improve the write characteristics such as the overwrite property.

Furthermore, according to the embodiment, since it is possible to allow magnetic flux of greater magnitude to pass through the pole layer 16 as described above, it is not necessary to greatly reduce the neck height NH. As a result, according to the embodiment, it is possible to define the track width with precision.

Furthermore, according to the embodiment, since the angle of inclination θa of the first portion 16T1 taken at an arbitrary point Pa on the first portion 16T1 with respect to the direction perpendicular to the medium facing surface 30 increases with increasing distance from the medium facing surface 30 to the point Pa, even if the position of the medium facing surface 30 varies when the medium facing surface 30 is formed by polishing, a variation in thickness of the pole layer 16 taken in the medium facing surface 30 is moderate, and accordingly a variation in write characteristics is also moderate.

If the angle of inclination θ1 is too small, the effect of allowing magnetic flux of greater magnitude to be passed through the pole layer 16 in the neighborhood of the medium facing surface 30 is reduced. On the other hand, if the angle of inclination θ1 is too great, there occurs a great variation in thickness of the pole layer 16 taken in the medium facing surface 30 in response to a variation in the position of the medium facing surface 30 when the medium facing surface 30 is formed by polishing. In view of these, the angle of inclination θ1 should preferably fall within a range of 15 to 40 degrees, and more preferably within a range of 18 to 30 degrees.

Furthermore, according to the embodiment, by partially etching the magnetic layer 160 by IBE using the nonmagnetic layer 17 as the mask as previously described, it is easy to form the first portion 16T1.

In the embodiment, the nonmagnetic layer 17 is disposed on the second portion 16T2 of the top surface 16T of the pole layer 16. The nonmagnetic layer 17 has the bottom surface touching the second portion 16T2, and this bottom surface has the edge E3 located at the second edge E2. The position of the second edge E2 has an influence on the write characteristics of the magnetic head. It is therefore important to control the position of the second edge E2 with precision. In the embodiment, by etching the magnetic layer 160 using the nonmagnetic layer 17 remaining on the second portion 16T2 of the top surface 16T of the pole layer 16 as a mask, the position of the second edge E2 is defined by the edge E3 of the bottom surface of the nonmagnetic layer 17. According to the embodiment, it is possible to control the position of the second edge E2 with higher precision as compared with a case where the position of the second edge E2 is defined by etching the magnetic layer 160 using a mask made of photoresist, instead of the nonmagnetic layer 17.

Furthermore, in the embodiment, the first layer 20A of the shield 20 has the bottom surface touching the gap layer 18. The bottom surface of the first layer 20A bends to be opposed to the pole layer 16 and the nonmagnetic layer 17 with the gap layer 18 in between. The distance between the bottom surface of the first layer 20A and the second portion 16T2 is greater than the distance between the bottom surface of the first layer 20A and the first portion 16T1. In the embodiment the throat height TH is not defined by an end of the first layer 20A farther from the medium facing surface 30, but is defined by the position of the edge E3 of the bottom surface of the nonmagnetic layer 17. As a result, it is possible to reduce the throat height TH while sufficiently increasing the volume of the first layer 20A. Furthermore, the position of the edge E3 that defines the throat height TH can be determined with precision. Consequently, according to the embodiment, it is possible to precisely control throat height TH of a small value. The foregoing features of the embodiment make it possible to improve the overwrite property and to increase the speed of response of a write magnetic field to a change in current fed to the coil 23 even if the current is of a small value.

In the pole layer 16, flux leakage from the pole layer 16 is likely to occur in a neighborhood of the second edge E2 of the top surface 16T. If the leakage flux reaches the medium facing surface 30 and further leaks to the outside from the medium facing surface 30, the effective track width may increase and the problems resulting from the skew may occur. In the embodiment, the shield 20 has a portion located between the second edge E2 and the medium facing surface 30. As a result, the magnetic flux leaking from the neighborhood of the second edge E2 in the pole layer 16 is taken in by the shield 20. This makes it possible to prevent a magnetic flux that leaks halfway through the pole layer 16 from further leaking to the outside from the medium facing surface 30.

In the embodiment, the top surface of the pole layer 16 bends near the medium facing surface 30. This makes it possible to suppress formation of residual magnetization in the direction perpendicular to the medium facing surface 30 in a portion of the pole layer 16 near the medium facing surface 30 after writing is performed. As a result, according to the embodiment, it is possible to suppress the occurrence of a phenomenon in which data stored on a recording medium is erased due to residual magnetization in the pole layer 16 after writing is performed.

In the embodiment, the pole layer 16 is disposed in the groove 12a of the encasing layer 12 made of a nonmagnetic material, with the nonmagnetic film 14 and the polishing stopper layer 15 disposed between the pole layer 16 and the groove 12a. The width of the pole layer 16 is therefore smaller than that of the groove 12a. This makes it easy to form the groove 12a and to reduce the width of the pole layer 16 and the width of the top surface of the track width defining portion 16A that defines the track width, in particular. As a result, according to the embodiment, it is possible to easily implement a track width that is smaller than the minimum track width that can be formed by photolithography, and to control the track width with accuracy.

Second Embodiment

Figure 21:
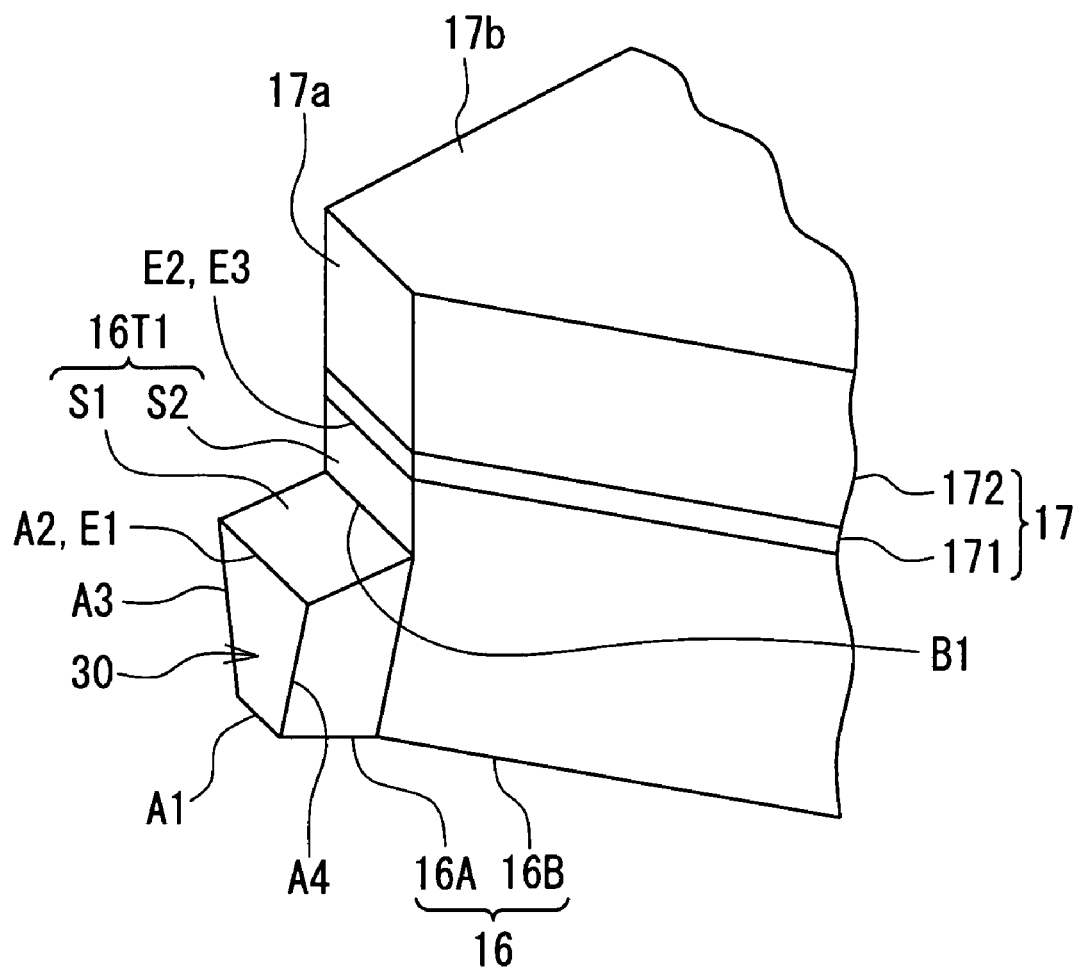
FIG. 21 is a perspective view illustrating respective portions of a pole layer and a nonmagnetic layer of a magnetic head of a second embodiment of the invention near the medium facing surface.
Figure 22:
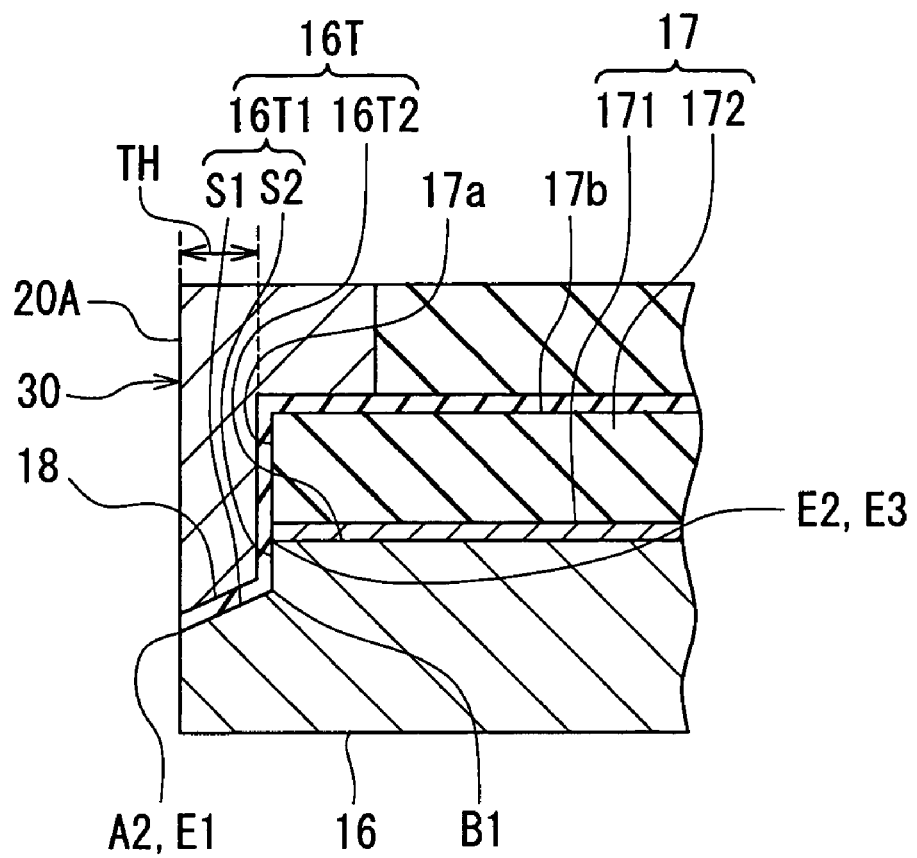
FIG. 22 is a cross-sectional view illustrating respective portions of the pole layer, the nonmagnetic layer, a gap layer and a shield of the magnetic head of the second embodiment of the invention near the medium facing surface.
Figure 23:
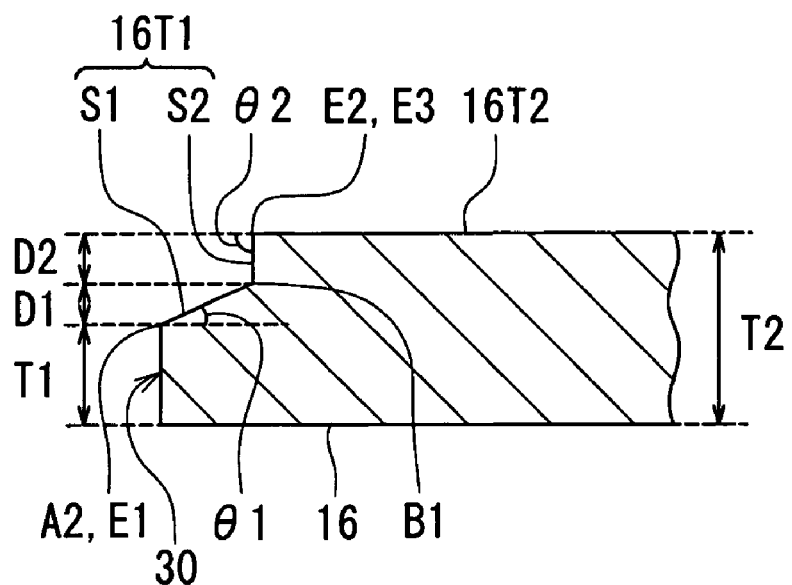
FIG. 23 is a cross-sectional view of a portion of the pole layer of the magnetic head of the second embodiment of the invention near the medium facing surface.

A magnetic head and a method of manufacturing the same of a second embodiment of the invention will now be described. Reference is now made to FIG. 21 to FIG. 23 to describe the configuration of the magnetic head of the second embodiment. FIG. 21 is a perspective view illustrating respective portions of the pole layer 16 and the nonmagnetic layer 17 of the embodiment near the medium facing surface 30. FIG. 22 is a cross-sectional view illustrating respective portions of the pole layer 16, the nonmagnetic layer 17, the gap layer 18 and the shield 20 of the embodiment near the medium facing surface 30. FIG. 23 is a cross-sectional view of a portion of the pole layer 16 of the embodiment near the medium facing surface 30.

In the second embodiment, both of the second flat surface portion S2 of the first portion 16T1 of the top surface 16T of the pole layer 16 and the front end face 17a of the nonmagnetic layer 17 are formed into flat surfaces that are substantially parallel to the medium facing surface 30. Therefore, in the embodiment, the second angle of inclination $\theta 2$ is 90 degrees. Furthermore, in the embodiment, the nonmagnetic layer 17 does not have the coupling surface 17c, so that a ridgeline is formed between the front end face 17a and the top surface 17b. The respective value ranges of $\theta 1$, T1, T2, D1 and D2 of FIG. 23 are the same as those of the first embodiment.

The first layer 20A of the shield 20 has a bottom surface touching the gap layer 18. The bottom surface of the first layer 20A bends to be opposed to the pole layer 16 and the nonmagnetic layer 17 with the gap layer 18 in between. The distance between the bottom surface of the first layer 20A and the second portion 16T2 is greater than the distance between the bottom surface of the first layer 20A and the first portion 16T1.

In the second embodiment, the throat height TH is the distance from the medium facing surface 30 to the point at which the gap layer 18 first bends when seen from the medium facing surface 30, that is, the distance from the medium facing surface 30 to the point at which the bottom surface of the first layer 20A first bends when seen from the medium facing surface 30.

Figure 24:
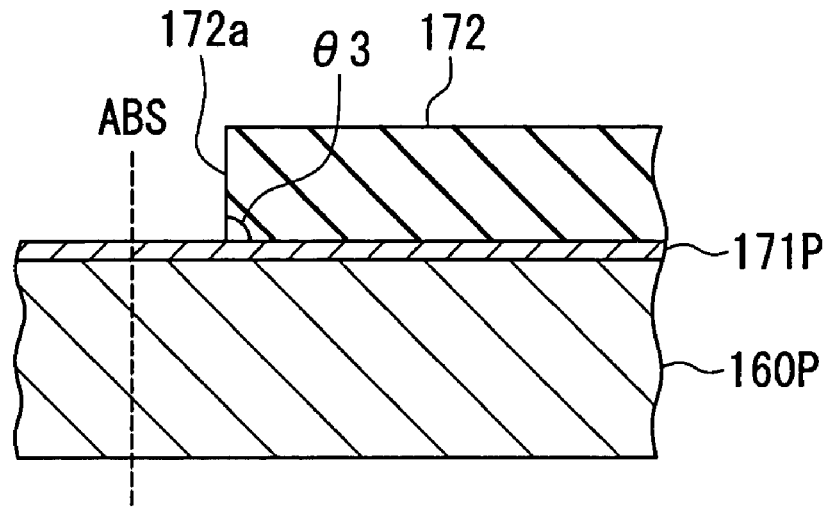
FIG. 24 is a cross-sectional view for illustrating a step of a method of manufacturing the magnetic head of the second embodiment of the invention.
Figure 25:
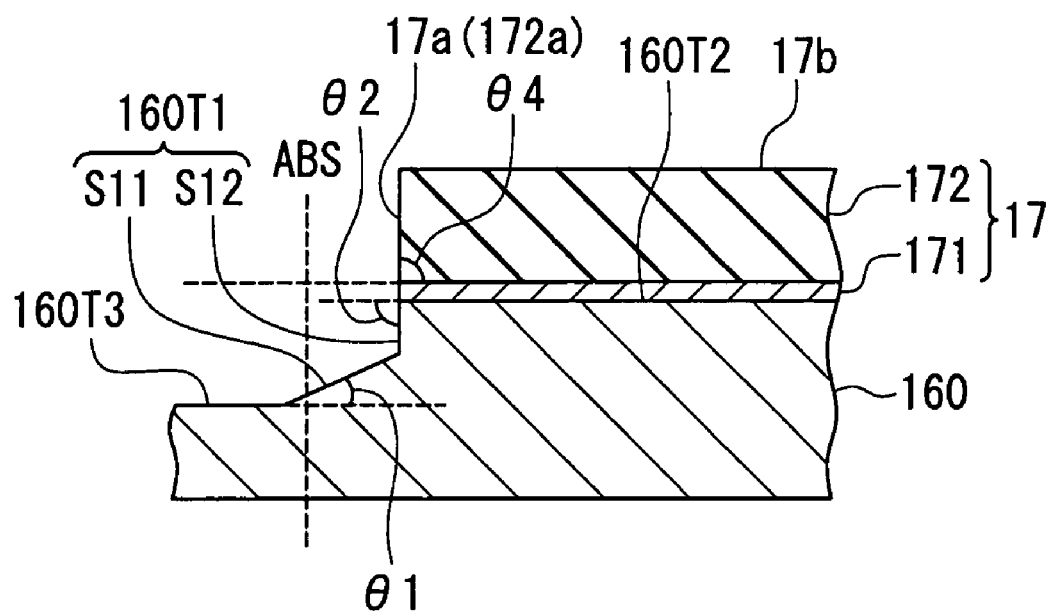
FIG. 25 is a cross-sectional view for illustrating a step that follows the step of FIG. 24.
Figure 26:
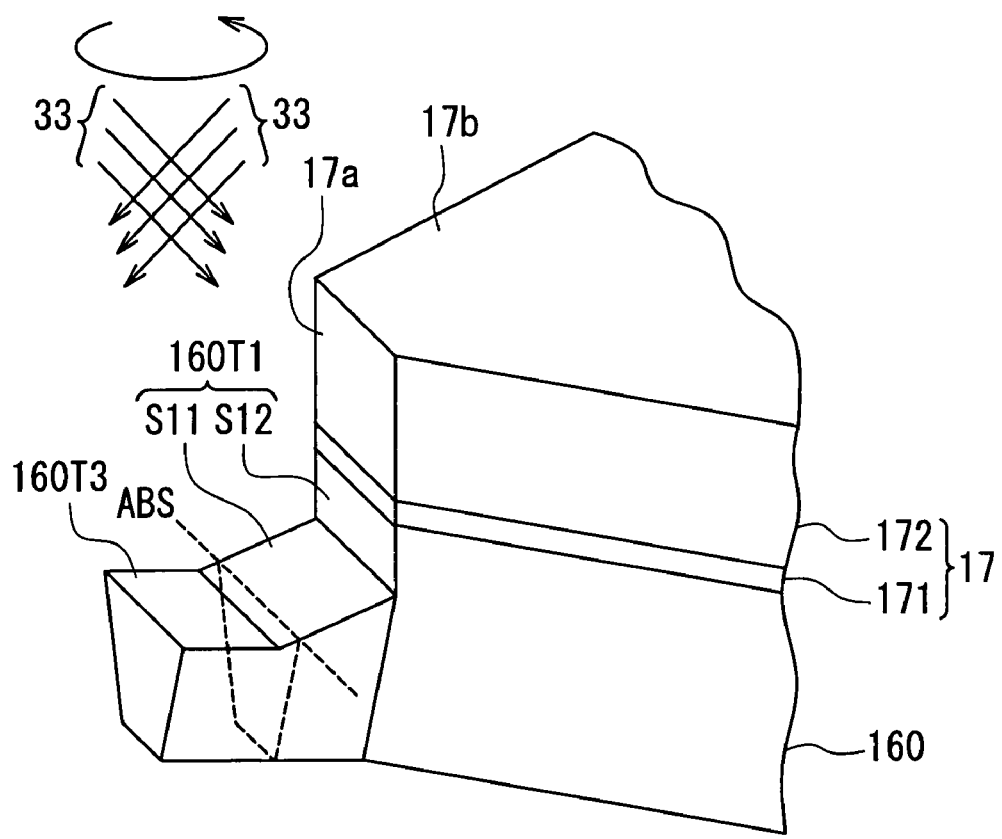
FIG. 26 is a perspective view for illustrating the step of FIG. 25.

Reference is now made to FIG. 24 to FIG. 26 to describe the method of manufacturing the magnetic head of the second embodiment. The steps of the method of manufacturing the magnetic head of the second embodiment are the same as those of the first embodiment up to the step illustrated in FIG. 11A and FIG. 11B. In the next step of the second embodiment, similarly to the step of FIG. 12A and FIG. 12B, the second layer 172 is formed by partially etching the second film 172P by RIE, for example, using the mask 32. In this step of the second embodiment, however, as illustrated in FIG. 24, the second layer 172 is formed such that the front end face 172a is formed into a flat surface substantially parallel to the plane ABS. Consequently, in the second embodiment, the angle of inclination $\theta 3$ of the front end face 172a with respect to the direction perpendicular to the medium facing surface 30 is 90 degrees. In FIG. 24, the reference numeral 160P indicates a magnetic layer made up of a combination of the magnetic layers 161P and 162P.

A specific example of the method of etching the second film 172P will now be described in detail. In this example, the material of the first film 171P is Ru while the material of the second film 172P is $Al_2O_3$. The second film 172P is etched by RIE using an etching gas containing $BCl_3$ and $Cl_2$. The proportion of $BCl_3$ and $Cl_2$ in the etching gas is 4:1 to 6:1. By way of example, the etching gas contains 80-sccm $BCl_3$ and 15-sccm $Cl_2$. In this example, RIE is performed using high-density plasma, with high-frequency bias power of 30 to 60 W and a pressure of 0.2 to 0.5 Pa, to etch the second film 172P. By etching the second film 172P under the foregoing conditions, it is possible to form the second layer 172 such that the front end face 172a is formed into a flat surface substantially parallel to the plane ABS. The etching of the second film 172P by RIE as described above is performed at least until the first film 171P is exposed.

Next, similarly to the step of FIG. 13A and FIG. 13B of the first embodiment, the first film 171P and the magnetic layers 161P and 162P are each partially etched using the second layer 172 as a mask. A specific example of this step will now be described with reference to FIG. 25 and FIG. 26. FIG. 25 is a cross-sectional view illustrating the step of etching the first film 171P and the magnetic layers 161P and 162P. FIG. 26 is a perspective view illustrating the step of FIG. 25.

This step is similar to the step illustrated in FIG. 19 and FIG. 20 of the first embodiment. To be specific, in this step, first, the first film 171P is partially etched by IBE using the second layer 172 as a mask. As a result, the first film 171P becomes the first layer 171, whereby the nonmagnetic layer 17 having the first layer 171 and the second layer 172 is formed. In the second embodiment, the angle of inclination $\theta 4$ of the front end face 172a after this etching is 90 degrees.

Next, the magnetic layer 160P is partially etched by IBE using the nonmagnetic layer 17 as a mask. The magnetic layer 160P thereby becomes the magnetic layer 160. In FIG. 26 the arrows marked with numeral 33 each indicate an ion beam of IBE. The partial etching of the magnetic layer 160P is performed such that the direction of travel of the ion beam 33 forms an angle within a range of 40 to 50 degrees with respect to the direction perpendicular to the top surface of the substrate 1, and that the direction of travel of the ion beam rotates when seen in the direction perpendicular to the top surface of the substrate 1. By performing IBE in such a manner, as in the first embodiment, the first portion 160T1, the second portion 160T2 and the third portion 160T3 are formed in the top surface of the magnetic layer 160P. The first portion 160T1 includes the first flat surface portion S11 and the second flat surface portion S12.

In the step of partially etching the magnetic layer 160P, the second flat surface portion S12 and an end face of the first layer 171 closer to the medium facing surface 30 are formed to be contiguous to the front end face 172a. In the second embodiment, the angle of inclination θ2 of the second flat surface portion S12 is equal to the angle of inclination θ4 of the front end face 172a, which is 90 degrees.

Furthermore, in the step of partially etching the magnetic layer 160P, a portion of the top surface of the magnetic layer 160P away from the front end face 172a of the second layer 172 is etched almost evenly, so that the third portion 160T3 is formed. The first flat surface portion S11 having the angle of inclination θ1 is formed between the third portion 160T3 and the second flat surface portion S12 due to a shadow effect of the second layer 172. The angle of inclination θ1 is greater than zero degree and smaller than the angle of inclination θ2 of the second flat surface portion S12. For example, the angle of inclination θ1 is within a range of 15 to 40 degrees. The angle of inclination θ1 is determined by the thickness of the second layer 172 and the angle formed by the direction of travel of the ion beam 33 with respect to the direction perpendicular to the top surface of the substrate 1.

In the method of manufacturing the magnetic head of the second embodiment, the steps performed after the step of partially etching the magnetic layer 160P are the same as those of the first embodiment. The remainder of configuration, function and effects of the second embodiment are similar to those of the first embodiment.

Third Embodiment

Figure 27:
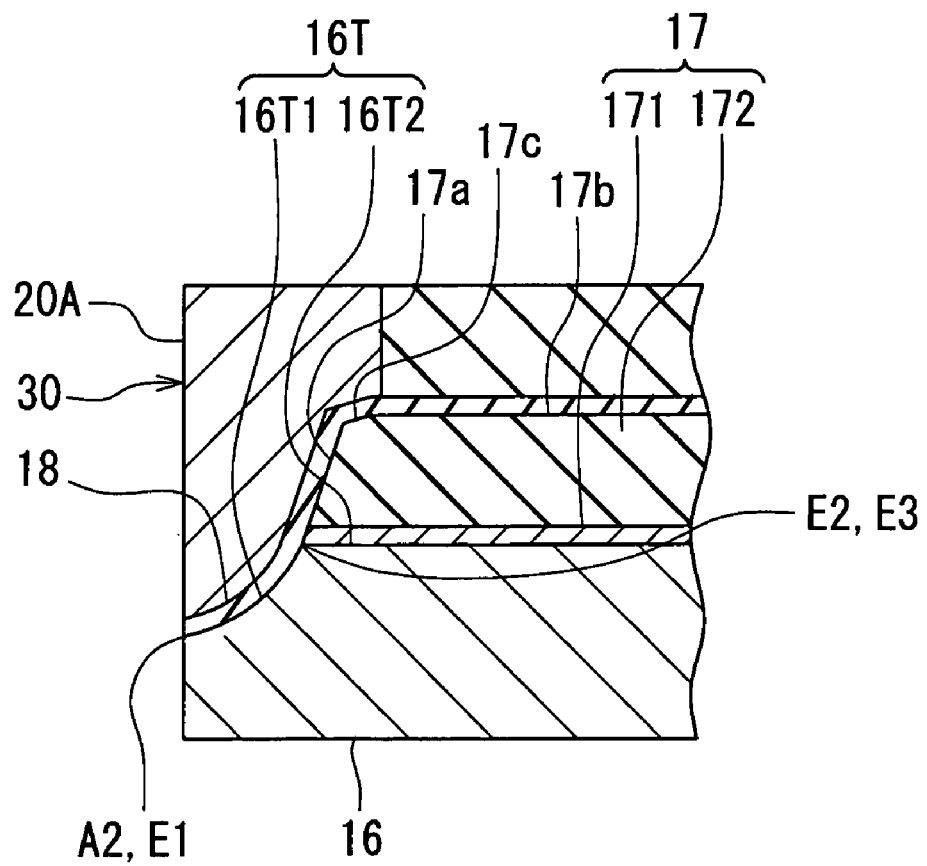
FIG. 27 is a cross-sectional view illustrating respective portions of a pole layer, a nonmagnetic layer, a gap layer and a shield of a magnetic head of a third embodiment of the invention near the medium facing surface.
Figure 28:
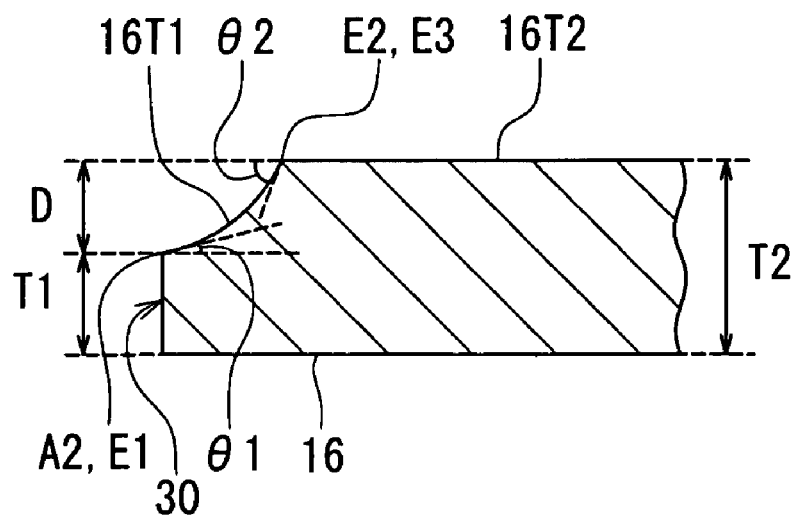
FIG. 28 is a cross-sectional view of a portion of the pole layer of the magnetic head of the third embodiment of the invention near the medium facing surface.

A magnetic head and a method of manufacturing the same of a third embodiment of the invention will now be described. Reference is now made to FIG. 27 and FIG. 28 to describe the configuration of the magnetic head of the third embodiment. FIG. 27 is a cross-sectional view illustrating respective portions of the pole layer 16, the nonmagnetic layer 17, the gap layer 18 and the shield 20 of the embodiment near the medium facing surface 30. FIG. 28 is a cross-sectional view of a portion of the pole layer 16 of the embodiment near the medium facing surface 30.

In the third embodiment, the first portion 16T1 of the top surface 16T of the pole layer 16 does not include any flat surface portion, so that the entire first portion 16T1 is formed into a recessed curved surface. The angle of inclination of the first portion 16T1 taken at an arbitrary point on the first portion 16T1 with respect to the direction perpendicular to the medium facing surface 30 increases continuously with increasing distance from the medium facing surface 30 to the arbitrary point. The angle of inclination θ1 of the first portion 16T1 taken at the first edge E1 with respect to the direction perpendicular to the medium facing surface 30 is greater than zero degree. The angle of inclination θ2 of the first portion 16T1 taken at the second edge E2 with respect to the direction perpendicular to the medium facing surface 30 is greater than the angle of inclination θ1. The angle of inclination θ1 is preferably within a range of 15 to 40 degrees. The angle of inclination θ2 is preferably within a range of 40 to 75 degrees.

Here, as illustrated in FIG. 28, the thickness of the pole layer 16 taken in the medium facing surface 30 is represented by T1, and the distance between the second portion 16T2 and the bottom surface of the pole layer 16 is represented by T2. The difference in height between the first edge E1 and the second edge E2, that is, the difference between the first edge E1 and the second edge E2 in distance from the top surface of the substrate 1, is represented by D. D is within a range of 0.06 to 0.30 μm, for example. The respective ranges of T1 and T2 are the same as those of the first embodiment.

The first portion 16T1 of the third embodiment can be formed by, for example, in the process of etching the magnetic layer 160P described with reference to FIG. 19 and FIG. 20 in the first embodiment, changing the angle to be formed by the direction of travel of the ion beam 33 with respect to the direction perpendicular to the top surface of the substrate 1 within a predetermined angle range.

The remainder of configuration, function and effects of the third embodiment are similar to those of the first embodiment.

The present invention is not limited to the foregoing embodiments but can be carried out in various modifications. For example, in each of the foregoing embodiments, the planar spiral-shaped coils 9 and 23 may be replaced with a coil helically wound around the pole layer 16.

In the foregoing embodiments, at least part of the pole layer 16 is formed in the groove 12a of the encasing layer 12. However, the pole layer of the present invention is not limited to the one formed in such a manner but may be formed otherwise. For example, the pole layer may be formed by patterning a magnetic layer by etching, or may be formed by frame plating.

While the foregoing embodiments have been described with reference to a magnetic head having a structure in which the read head is formed on the base body and the write head is stacked on the read head, the read head and the write head may be stacked in the reverse order.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A magnetic head for perpendicular magnetic recording comprising:
    a medium facing surface that faces toward a recording medium;
    a coil for generating a magnetic field corresponding to data to be written on the recording medium;
    a pole layer having an end face located in the medium facing surface, the pole layer allowing a magnetic flux corresponding to the magnetic field generated by the coil to pass therethrough and generating a write magnetic field for writing the data on the recording medium by means of a perpendicular magnetic recording system;
    a shield made of a magnetic material and having an end face located in the medium facing surface at a position forward of the end face of the pole layer along a direction of travel of the recording medium;
    a gap layer that is made of a nonmagnetic material, has an end face located in the medium facing surface, and is disposed between the pole layer and the shield; and
    a substrate on which the coil, the pole layer, the gap layer and the shield are stacked,
    the pole layer being disposed closer to the substrate than is the shield, wherein:
    the end face of the pole layer located in the medium facing surface has a first side closer to the substrate, and a second side opposite to the first side, the second side defining a track width;
    the pole layer has a top surface that is farther from the substrate;
    the top surface of the pole layer includes: a first portion having a first edge located in the medium facing surface and a second edge opposite thereto; and a second portion located farther from the medium facing surface than the first portion and connected to the first portion at the second edge, the first edge coinciding with the second side;

a distance from the substrate to an arbitrary point on the first portion increases with increasing distance from the medium facing surface to the arbitrary point;

the first portion has an angle of inclination with respect to a direction perpendicular to the medium facing surface, and the angle of inclination taken at the arbitrary point increases stepwise or continuously with increasing distance from the medium facing surface to the arbitrary point;

the angle of inclination taken at the first edge is greater than zero degree; and the second portion extends in a direction substantially perpendicular to the medium facing surface.

2. The magnetic head for perpendicular magnetic recording according to claim 1, wherein the first portion includes: a first flat surface portion including the first edge and having a specific first angle of inclination; and a second flat surface portion including the second edge and having a specific second angle of inclination greater than the first angle of inclination.

3. The magnetic head for perpendicular magnetic recording according to claim 2, wherein the first angle of inclination is within a range of 15 to 40 degrees while the second angle of inclination is within a range of 40 to 75 degrees.

4. The magnetic head for perpendicular magnetic recording according to claim 2, wherein the first angle of inclination is within a range of 15 to 40 degrees while the second angle of inclination is 90 degrees.

5. The magnetic head for perpendicular magnetic recording according to claim 1, further comprising a nonmagnetic layer made of a nonmagnetic material and disposed on the second portion, wherein the nonmagnetic layer has a bottom surface touching the second portion, and the bottom surface has an edge located at the second edge.

6. The magnetic head for perpendicular magnetic recording according to claim 5, wherein:

the gap layer is disposed on the pole layer and the nonmagnetic layer;

the shield has a bottom surface touching the gap layer; and the bottom surface of the shield bends to be opposed to the pole layer and the nonmagnetic layer with the gap layer in between.

7. The magnetic head for perpendicular magnetic recording according to claim 5, wherein the nonmagnetic layer has a front end face that faces toward the medium facing surface, and a distance from the medium facing surface to an arbitrary point on the front end face increases with increasing distance from the substrate to the point.

8. The magnetic head for perpendicular magnetic recording according to claim 7, wherein the front end face has an angle of inclination within a range of 40 to 75 degrees with respect to the direction perpendicular to the medium facing surface.

9. The magnetic head for perpendicular magnetic recording according to claim 5, wherein the nonmagnetic layer has a front end face that faces toward the medium facing surface, the front end face being a flat surface that is substantially parallel to the medium facing surface.

10. The magnetic head for perpendicular magnetic recording according to claim 1, wherein the end face of the pole layer located in the medium facing surface has a width that decreases with decreasing distance from the first side.

11. The magnetic head for perpendicular magnetic recording according to claim 5, wherein the nonmagnetic layer includes a layer made of an inorganic insulating material.

12. The magnetic head for perpendicular magnetic recording according to claim 5, wherein the nonmagnetic layer includes a layer made of a metal material.

13. The magnetic head for perpendicular magnetic recording according to claim 5, wherein the nonmagnetic layer includes: a first layer made of a metal material and disposed on the second portion; and a second layer made of an inorganic insulating material and disposed on the first layer.

14. The magnetic head for perpendicular magnetic recording according to claim 13, wherein the first layer is made of Ru, NiCr or NiCu, while the second layer is made of $Al_2O_3$ or a silicon oxide.

15. The magnetic head for perpendicular magnetic recording according to claim 1, wherein the shield is connected to the pole layer at a position away from the medium facing surface, and the coil includes a portion that passes through a space surrounded by the pole layer and the shield.

16. A method of manufacturing a magnetic head for perpendicular magnetic recording, the magnetic head comprising:

a medium facing surface that faces toward a recording medium;

a coil for generating a magnetic field corresponding to data to be written on the recording medium;

a pole layer having an end face located in the medium facing surface, the pole layer allowing a magnetic flux corresponding to the magnetic field generated by the coil to pass therethrough and generating a write magnetic field for writing the data on the recording medium by means of a perpendicular magnetic recording system;

a shield made of a magnetic material and having an end face located in the medium facing surface at a position forward of the end face of the pole layer along a direction of travel of the recording medium;

a gap layer that is made of a nonmagnetic material, has an end face located in the medium facing surface, and is disposed between the pole layer and the shield; and a substrate on which the coil, the pole layer, the gap layer and the shield are stacked, wherein:

the pole layer is disposed closer to the substrate than is the shield;

the end face of the pole layer located in the medium facing surface has a first side closer to the substrate, and a second side opposite to the first side, the second side defining a track width;

the pole layer has a top surface that is farther from the substrate;

the top surface of the pole layer includes: a first portion having a first edge located in the medium facing surface and a second edge opposite thereto; and a second portion located farther from the medium facing surface than the first portion and connected to the first portion at the second edge, the first edge coinciding with the second side;

a distance from the substrate to an arbitrary point on the first portion increases with increasing distance from the medium facing surface to the arbitrary point;

the first portion has an angle of inclination with respect to a direction perpendicular to the medium facing surface, and the angle of inclination taken at the arbitrary point increases stepwise or continuously with increasing distance from the medium facing surface to the arbitrary point;

the angle of inclination taken at the first edge is greater than zero degree; and the second portion extends in a direction substantially perpendicular to the medium facing surface, the magnetic head further comprising a nonmagnetic layer made of a nonmagnetic material and disposed on the second portion, wherein the nonmagnetic layer has a bottom surface touching the second portion, and the bottom surface has an edge located at the second edge, the method comprising the steps of:

forming a magnetic layer that is to undergo partial etching later and that is to become the pole layer when the medium facing surface is formed;

forming the nonmagnetic layer on the magnetic layer;

partially etching the magnetic layer using the nonmagnetic layer as a mask so that two portions are formed in a top surface of the magnetic layer, the two portions being intended to become the first portion and the second portion later when the medium facing surface is formed;

forming the gap layer on the magnetic layer and the nonmagnetic layer;

forming the shield on the gap layer;

forming the coil; and forming the medium facing surface so that the magnetic layer becomes the pole layer.

17. The method according to claim 16, wherein the first portion includes: a first flat surface portion including the first edge and having a specific first angle of inclination; and a second flat surface portion including the second edge and having a specific second angle of inclination greater than the first angle of inclination.

18. The method according to claim 17, wherein the first angle of inclination is within a range of 15 to 40 degrees while the second angle of inclination is within a range of 40 to 75 degrees.

19. The method according to claim 17, wherein the first angle of inclination is within a range of 15 to 40 degrees while the second angle of inclination is 90 degrees.

20. The method according to claim 16, wherein:

the gap layer is disposed on the pole layer and the nonmagnetic layer;

the shield has a bottom surface touching the gap layer; and the bottom surface of the shield bends to be opposed to the pole layer and the nonmagnetic layer with the gap layer in between.

21. The method according to claim 16, wherein the nonmagnetic layer has a front end face that faces toward the medium facing surface, and a distance from the medium facing surface to an arbitrary point on the front end face increases with increasing distance from the substrate to the point.

22. The method according to claim 21, wherein the front end face has an angle of inclination within a range of 40 to 75 degrees with respect to the direction perpendicular to the medium facing surface.

23. The method according to claim 22, wherein, in the step of partially etching the magnetic layer, the magnetic layer is partially etched by ion beam etching such that a direction of travel of an ion beam forms an angle within a range of 45 to 55 degrees with respect to a direction perpendicular to a top surface of the substrate, and that the direction of travel of the ion beam rotates when seen in the direction perpendicular to the top surface of the substrate.

24. The method according to claim 16, wherein the nonmagnetic layer has a front end face that faces toward the medium facing surface, the front end face being a flat surface that is substantially parallel to the medium facing surface.

25. The method according to claim 24, wherein, in the step of partially etching the magnetic layer, the magnetic layer is partially etched by ion beam etching such that a direction of travel of an ion beam forms an angle within a range of 40 to 50 degrees with respect to a direction perpendicular to a top surface of the substrate, and that the direction of travel of the ion beam rotates when seen in the direction perpendicular to the top surface of the substrate.

26. The method according to claim 16, wherein the end face of the pole layer located in the medium facing surface has a width that decreases with decreasing distance from the first side.

27. The method according to claim 16, wherein the nonmagnetic layer includes a layer made of an inorganic insulating material.

28. The method according to claim 16, wherein the nonmagnetic layer includes a layer made of a metal material.

29. The method according to claim 16, wherein:

the nonmagnetic layer includes: a first layer made of a metal material and disposed on the second portion; and a second layer made of an inorganic insulating material and disposed on the first layer; and the step of forming the nonmagnetic layer includes the steps of:

forming a first film on the magnetic layer, the first film being intended to become the first layer later by being etched partially;

forming a second film on the first film, the second film being intended to become the second layer later by being etched partially;

partially etching the second film by reactive ion etching so that the second film becomes the second layer; and partially etching the first film by ion beam etching, with the second layer used as a mask, so that the first film becomes the first layer.

30. The method according to claim 29, wherein the first layer is made of Ru, NiCr or NiCu, while the second layer is made of $Al_2O_3$ or a silicon oxide.

31. The method according to claim 16, wherein the shield is connected to the pole layer at a position away from the medium facing surface, and the coil includes a portion that passes through a space surrounded by the pole layer and the shield.

32. The method according to claim 16, wherein the gap layer is formed by chemical vapor deposition in which formation of a single atomic layer is repeated.

33. The method according to claim 16, wherein:

in the step of forming the magnetic layer, an indicator is formed, the indicator being intended to be used later as a reference when a position of the edge of the bottom surface of the nonmagnetic layer is determined; and in the step of forming the nonmagnetic layer, the position of the edge of the bottom surface of the nonmagnetic layer is determined with the indicator used as the reference.

* * * * *